US008749100B2

(12) United States Patent
Koshizuka et al.

(10) Patent No.: US 8,749,100 B2
(45) Date of Patent: Jun. 10, 2014

(54) OVERVOLTAGE SUPPRESSING DEVICE

(75) Inventors: Tadashi Koshizuka, Saitamashi (JP);
Minoru Saito, Kamakurashi (JP);
Hiroyuki Maehara, Tokyo (JP);
Yoshimasa Sato, Kasawakishi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 686 days.

(21) Appl. No.: 13/018,268

(22) Filed: Jan. 31, 2011

(65) Prior Publication Data

US 2011/0211288 A1 Sep. 1, 2011

(30) Foreign Application Priority Data

Feb. 19, 2010 (JP) .................................. 2010-035026

(51) Int. Cl.
*H01H 47/00* (2006.01)
(52) U.S. Cl.
USPC ........... 307/130; 307/113; 307/105; 307/109; 333/12; 333/20
(58) Field of Classification Search
CPC ........ H02J 9/06; H01H 9/56; G01R 19/16542
USPC ........... 307/130, 129, 73, 118, 125, 116, 127, 307/45, 46, 10.1; 318/807, 812; 361/76, 77, 361/185, 244; 323/222, 223, 224, 226, 282, 323/283, 266
See application file for complete search history.

(56) References Cited

U.S. PATENT DOCUMENTS

| 7,902,696 | B2 * | 3/2011 | Tsutada et al. | 307/129 |
| 7,936,093 | B2 * | 5/2011 | Kinoshita et al. | 307/127 |
| 8,531,150 | B2 * | 9/2013 | Kitanaka | 318/807 |

FOREIGN PATENT DOCUMENTS

JP 2003-168335 6/2003

OTHER PUBLICATIONS

Froehlich, et al., "Controlled Closing on Shunt Reactor Compensated Transmission Lines, Part I: Closing Control Device Development," IEEE Transactions on Power Delivery, Apr. 1997, pp. 734-740, vol. 12, No. 2.
Hase, "Handbook of Practical Theory of Power System Technology," Maruzen Kabushiki Kaisha, Mar. 30, 2004, p. 307-308.

* cited by examiner

*Primary Examiner* — Rexford Barnie
*Assistant Examiner* — Jagdeep Dhillon
(74) *Attorney, Agent, or Firm* — Baker Botts L.L.P.

(57) ABSTRACT

In some embodiments, a method is disclosed that includes measuring a waveform of a power source side voltage of a circuit breaker; measuring a waveform of a transmission line side voltage of the circuit breaker; calculating a waveform of a voltage between contacts of the circuit breaker that is a difference between the waveform of the power source side voltage and the waveform of the transmission line side voltage; calculating a waveform of an absolute value of the waveform of the voltage between contacts; extracting a waveform of a component in a frequency band which is lower than a frequency of the power source and higher than a frequency of a DC component from the waveform of the absolute value; detecting a cycle of the extracted waveform; and closing the circuit breaker based on the cycle.

20 Claims, 23 Drawing Sheets

OVERVOLTAGE SUPPRESSING DEVICE

CROSS-REFERENCE TO RELATED APPLICATIONS

This application is based upon and claims the benefit of priority from Japanese Patent Application No. 2010035026, filed on Feb. 19, 2010, the entire contents of which are incorporated herein by reference.

TECHNICAL FIELD

The present disclosure relates to an overvoltage suppressing device to suppress an overvoltage generated at the time of closing a circuit breaker.

BACKGROUND

In an unloaded transmission line which is not compensated by inductors, DC voltage remains at the transmission line after a circuit breaker breaks the transmission line. It is known that if the circuit breaker is reclosed in the state that the DC voltage remains, an overvoltage (closing surge) is generated. The magnitude of the overvoltage becomes several times the voltage of the system. If the large overvoltage is generated like this, it is worried that the insulation of the equipments installed in the system is affected.

For this reason, as a method to suppress the overvoltage at the time of closing the unloaded transmission line, it is known to provide a circuit breaker with a making resistor. In the 500 kV system in Japan, for example, a circuit breaker with a making resistor is employed so as to suppress the overvoltage like this. In the circuit breaker with a making resistor, a making resistor contact composed by connecting a making resistor and a contact in series is connected in parallel with a main contact of the circuit breaker. In the circuit breaker with a making resistor, the contact of the making resistor is closed prior to the main contact of the circuit breaker. By this, the overvoltage is suppressed.

On the other hand, in the unloaded transmission line which is compensated by an inductor, an oscillation voltage due to its electrostatic capacitance and inductance is generated in the transmission line after the circuit breaker breaks the transmission line. In such a case, if the circuit breaker is reclosed at the time point when the voltage between contacts of the circuit breaker is large, an overvoltage is generated. As an overvoltage suppressing method at the time of reclosing the transmission line compensated by the inductor, a method to control the closing phase of the circuit breaker is known. This is a method in which the circuit breaker is reclosed at the time point when the voltage between contacts is small. As a method to estimate the time point when the voltage between electrode contacts becomes small, the following is known.

As one method, a method to close the circuit breaker at the optimum timing by function approximating the voltage between contacts of the circuit breaker is disclosed as indicated in the following. Firstly, the power source voltage is assumed as a sine wave of the commercial frequency. In addition, if the oscillation voltage at the line side is composed of a single frequency, it can be assumed as a sine wave, too. The voltage between contacts is estimated by a function approximating both the voltages by the sine wave. The closing time of the circuit breaker is decided based on the voltage between contacts.

As a second method, a method to close the circuit breaker at the future zero point of the voltage between contacts by measuring the time between the zero points of the voltages between contacts of the circuit breaker is disclosed as indicated in the following. A time between the zero points of the voltage in a cycle of the voltage between contacts after breaking, and a time between the zero points of the voltage in a next cycle of the voltage between contacts is measured. If these two times between the zero points of the voltage between contacts are the same, the frequency of the voltage between contacts can be found. By this, the future zero point of the voltage between contacts can be estimated regardless of the waveform of the voltage between contacts.

However, in the above-described overvoltage suppressing method, there are following problems, respectively.

In the case that the overvoltage is suppressed using the circuit breaker with resistive element, it is necessary to add specifically the circuit breaker with resistive element to the usual circuit breaker. For this reason, in the case that the circuit breaker is seen as a whole, the circuit breaker may become large in size.

In the transmission line, there is a case that an inductor is installed so as to compensate its capacitive power. When the circuit breaker opens the transmission line where the inductor is installed, the voltage oscillation of the frequency determined by the electrostatic capacitance of the transmission line and the inductance of the inductor is generated in the transmission line. The frequency of the voltage oscillation of the line is generally different from the frequency of the power source voltage. In this case, the voltage between contacts of the circuit breaker becomes in the aspect of the multi frequency wave.

In this time, in the case that the circuit breaker is closed at the optimum timing by a function approximating the voltage between contacts of the circuit breaker, there is a following problem.

In the electrostatic capacitance of the transmission line to determine the frequency of the voltage oscillation of the line, there is a component to ground of the self-phase, a mutual component between the other phases, and a component to ground of the other phases. These electrostatic capacitances become different values for each phase depending on the geometric layout of the transmission line. For this reason, it is very rare that the oscillation waveform of the line side voltage becomes a sine wave with a single frequency. Generally, in many cases, the oscillation waveform itself is already in a multi frequency wave state. In this case, it is difficult that the voltage oscillation of the line in itself is made function approximated. Accordingly, it is actually extremely difficult to obtain the voltage between contacts from the function approximation.

In the case that the circuit breaker is closed in the state that the voltage is applied between contacts of the circuit breaker, when the voltage between contacts becomes larger than the dielectric strength between the contacts, discharge is generated between the contacts. If the discharge is generated, the circuit breaker is in electrical contact before the contacts they are in mechanical contact. This discharge is called as the pre-arcing.

Here, in the case that the voltage between contacts of the circuit breaker is in the multi frequency wave state, there may be a case that a wave height value of the voltage becomes not less than the power source voltage. In this case, if it is tried to close the circuit breaker when the voltage between contacts is at the zero point, it may be possible that the circuit breaker becomes in the closed state by the discharge due to the above-described pre-arcing at the time point when the voltage between contacts is large. In this case, a large overvoltage is generated. Thus, in the case that the voltage between contacts is in the form of a multi frequency wave, it is not possible to suppress the overvoltage by measuring only the zero point of the voltage between contacts.

An object of the present disclosure is to provide an overvoltage suppressing device which can suppress an overvoltage generated at the time of closing a circuit breaker even in the case that the voltage between contacts of the circuit breaker is in a multi frequency wave.

SUMMARY

In some embodiments, an system is disclosed that includes a power source side voltage detector operable to measure a waveform of a power source side voltage that is a voltage to ground at a power system side of a circuit breaker; a transmission line side voltage detector operable to measure a waveform of a transmission line side voltage that is a voltage to ground at the transmission line side of the circuit breaker; a waveform calculating device in communication with the power source side voltage detector and transmission line side voltage detector operable to: calculate an added waveform of the waveform of the power source side voltage that is measured by the power source side voltage detector and the waveform of the transmission line side voltage that is measured by the transmission line side voltage detector; calculate a waveform of an absolute value of the added waveform; extract a waveform of a component in a frequency band which is lower than a frequency of the power source side voltage and higher than a frequency of a DC component, from the waveform of the absolute value; and detect a cycle of the extracted waveform; and a switch operable to close the circuit breaker based on the detected cycle. The waveform calculating device further comprises a low pass filter to extract a low frequency component and a high pass filter to extract a high frequency component, a phase detecting unit, and a close-signal output unit. The waveform calculating device further comprises a band pass filter to extract a prescribed frequency band. The waveform calculating device is further operable to: determine whether a secondary arc current flowing through the transmission line is extinguished within a prescribed time; calculate a waveform of a voltage between contacts of the circuit breaker that is a difference between the waveform of the power source side voltage and the waveform of the transmission line side voltage; estimate a time point to close the circuit breaker when an absolute value of an instantaneous value of the voltage between contacts becomes a voltage value lower than a threshold value, in the case that the secondary arc is not extinguished within the prescribed time; and close the circuit breaker at the estimated time point to close the circuit breaker. The waveform calculating device further includes a band pass filter to extract a prescribed frequency band. The waveform calculating device further includes a low pass filter to extract a low frequency component and a high pass filter to extract a high frequency component.

In other embodiments, a system is disclosed that includes a power source side voltage measuring unit operable to measure a waveform of a power source side voltage that is a voltage to ground at a power system side of a circuit breaker; a transmission line side voltage measuring unit operable to measure a waveform of a transmission line side voltage that is a voltage to ground at the transmission line side of the circuit breaker; a computer in communication with power source side voltage measuring unit and the transmission line side voltage measuring unit operable to: calculate a waveform of a voltage between contacts of the circuit breaker that is a difference between the waveform of the power source side voltage and the waveform of the transmission line side voltage; calculate a waveform of an absolute value of the waveform of the voltage between contacts; extract a waveform of a component in a frequency band which is lower than a frequency of the power source and higher than a frequency of a DC component, from the waveform of the absolute value; and detect a cycle of the extracted waveform; and a circuit operable to close the circuit breaker based on the detected cycle. The computer further includes a low pass filter to extract a low frequency component and a high pass filter to extract a high frequency component. The computer further includes a band pass filter to extract a prescribed frequency band. The computer is further operable to: determine whether a secondary arc current flowing through the transmission line is extinguished within a prescribed time; estimate a time point to close the circuit breaker when an absolute value of an instantaneous value of the voltage between contacts becomes a voltage value lower than a threshold value, in the case that the secondary arc is not extinguished within the prescribed time; and close the circuit breaker at the estimated time point to close the circuit breaker. The computer further comprises a low pass filter to extract a low frequency component and a high pass filter to extract a high frequency component. The computer can further include a band pass filter to extract a prescribed frequency band.

In other embodiments, a method is disclosed that includes measuring a waveform of a power source side voltage which is a voltage to ground at the power system side of a circuit breaker; measuring a waveform of a transmission line side voltage which is a voltage to ground at the transmission line side of the circuit breaker; calculating an added waveform of the waveform of the power source side voltage and the waveform of the transmission line side voltage; extracting a waveform of a component in a frequency band which is lower than a frequency of the power source and higher than a frequency of a DC component from the added waveform; detecting a cycle of the extracted waveform; and closing the circuit breaker based on the cycle. The method can also include determining whether or not a secondary arc current flowing through the transmission line is extinguished within a prescribed time; calculating a waveform of a voltage between contacts of the circuit breaker which is a difference between the waveform of the power source side voltage and the waveform of the transmission line side voltage; estimating a time point to close the circuit breaker when an absolute value of an instantaneous value of the voltage between contacts becomes a voltage value lower than a threshold value, based on the waveform of the voltage between contacts, in the case that it is judged that the secondary arc is not extinguished within the prescribed time; and closing the circuit breaker at the time point.

In other embodiments a method is disclosed that includes measuring a waveform of a power source side voltage which is a voltage to ground at the power system side of a circuit breaker; measuring a waveform of a transmission line side voltage which is a voltage to ground at the transmission line side of the circuit breaker; calculating a waveform of a voltage between contacts of the circuit breaker that is a difference between the waveform of the power source side voltage and the waveform of the transmission line side voltage; calculating a waveform of an absolute value of the waveform of the voltage between contacts; extracting a waveform of a component in a frequency band which is lower than a frequency of the power source and higher than a frequency of a DC component from the waveform of the absolute value; detecting a cycle of the extracted waveform; and closing the circuit breaker based on the cycle. The method can also include determining whether or not a secondary arc current flowing through the transmission line is extinguished within a prescribed time; estimating a time point to close the circuit breaker when an absolute value of an instantaneous value of the voltage between contacts becomes a voltage value lower than a threshold value, based on the waveform of the voltage between contacts, in the case that it is judged that the secondary arc is not extinguished within the prescribed time; and closing the circuit breaker at the time point.

In other embodiments, an apparatus is disclosed that includes at least one computer-readable non-transitory storage medium comprising code, that, when executed by at least one processor, is operable to: receive a waveform of a power source side voltage that is a voltage to ground at a power system side of a circuit breaker; receive a waveform of a transmission line side voltage that is a voltage to ground at the transmission line side of the circuit breaker; calculate an added waveform of the waveform of the power source side voltage that is measured by the power source side voltage detector and the waveform of the transmission line side voltage that is measured by the transmission line side voltage detector; calculate a waveform of an absolute value of the added waveform; extract a waveform of a component in a frequency band which is lower than a frequency of the power source side voltage and higher than a frequency of a DC component, from the waveform of the absolute value; detect a cycle of the extracted waveform; and close the circuit breaker based on the detected cycle. The processor is further operable to: determine whether or not a secondary arc current flowing through the transmission line is extinguished within a prescribed time; estimate a time point to close the circuit breaker when an absolute value of an instantaneous value of the voltage between contacts becomes a voltage value lower than a threshold value, based on the waveform of the voltage between contacts, in the case that it is judged that the secondary arc is not extinguished within the prescribed time; and close the circuit breaker at the time point.

In other embodiments, an apparatus is disclosed that includes at least one computer-readable non-transitory storage medium comprising code, that, when executed by at least one processor, is operable to: receive a waveform of a power source side voltage that is a voltage to ground at a power system side of a circuit breaker; receive a waveform of a transmission line side voltage that is a voltage to ground at the transmission line side of the circuit breaker; calculate a waveform of a voltage between contacts of the circuit breaker that is a difference between the waveform of the power source side voltage and the waveform of the transmission line side voltage; calculate a waveform of an absolute value of the waveform of the voltage between contacts; extract a waveform of a component in a frequency band which is lower than a frequency of the power source and higher than a frequency of a DC component, from the waveform of the absolute value; detect a cycle of the extracted waveform; and close the circuit breaker based on the detected cycle. The processor is further operable to determine whether a secondary arc current flowing through the transmission line is extinguished within a prescribed time; estimate a time point to close the circuit breaker when an absolute value of an instantaneous value of the voltage between contacts becomes a voltage value lower than a threshold value, in the case that the secondary arc is not extinguished within the prescribed time; and close the circuit breaker at the estimated time point to close the circuit breaker.

DETAILED DESCRIPTION OF THE EMBODIMENTS

Figure 1:
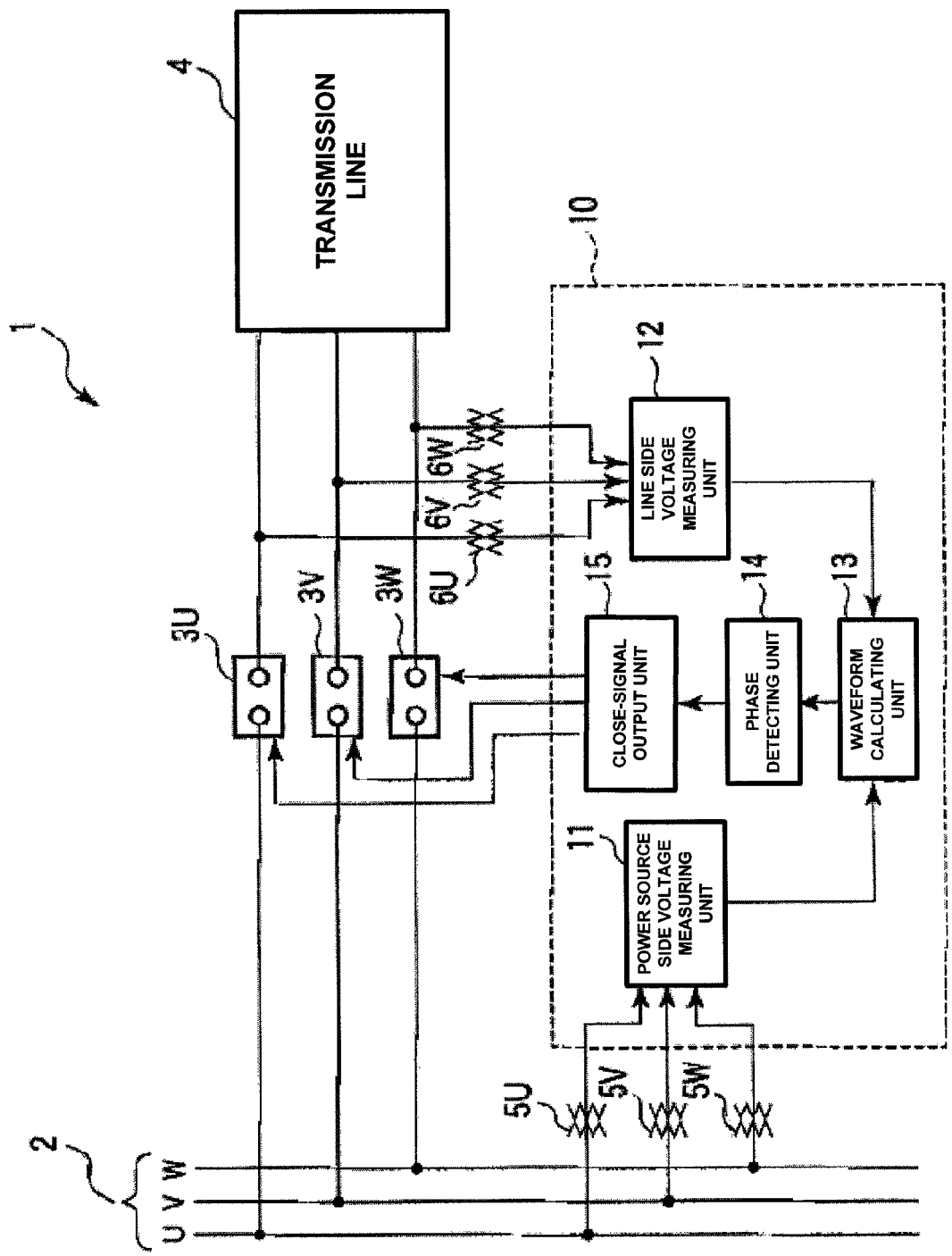
FIG. 1 A construction diagram showing a construction of a power system to which an overvoltage suppressing device according to a first embodiment of the present disclosure is applied.

FIG. 1 is a construction diagram showing a construction of a power system 1 to which an overvoltage suppressing device 10 according to a first embodiment of the present disclosure is applied. In addition, the same reference numerals are given to the same portions in the following drawings and the detailed description thereof will be omitted, and the different portions will be mainly described. The duplicated descriptions will be omitted in the following embodiments in the same manner.

The power system 1 is provided with a power source bus 2, circuit breakers 3U, 3V, 3W of the three phases, a transmission line 4, power source side voltage detectors 5U, 5V, 5W of the three phases, line side voltage detectors 6U, 6V, 6W of the three phases and the overvoltage suppressing device 10.

The power source bus 2 is a bus of the power system provided with a three phase AC power source composed of U phase, V phase and W phase.

The transmission line 4 is electrically connected to the power source bus 2 via the circuit breakers 3U, 3V, 3W. Though not shown, inductors are installed between each phase of the transmission line 4 and the ground. There is a case in which these inductors are installed at the both ends of the transmission line 4 or a case in which these inductors are installed only at one side.

The circuit breakers 3U, 3V, 3W connect each phase of the transmission line 4 and the power source bus 2, respectively. The circuit breakers 3U, 3V, 3W are each a circuit breaker of the each phase operation type to be operated individually for each phase. The circuit breakers 3U, 3V, 3W are provided for the U phase, the V phase, the W phase, respectively.

Each of the power source side voltage detectors 5U, 5V, 5W is provided for the corresponding phase of the power source bus 2, respectively. The power source side voltage detectors 5U, 5V, 5W are each a potential transformer, for example. Each of the power source side voltage detectors 5U, 5V, 5W detects the corresponding phase voltage (voltage to ground) of the power source bus 2, respectively. That is, each of the power source side voltage detectors 5U, 5V, 5W detects the power source side voltage of the corresponding circuit breakers 3U, 3V, 3W, respectively. Each of the power source side voltage detectors 5U, 5V, 5W outputs each of the detected phase voltages of the power source bus 2 to the overvoltage suppressing device 10, respectively.

Each of the line side voltage detectors 6U, 6V, 6W is provided for the corresponding phase of the transmission line 4, respectively. The line side voltage detectors 6U, 6V, 6W are each a potential transformer, for example. Each of the line side voltage detectors 6U, 6V, 6W detects the corresponding phase voltage (voltage to ground) of the transmission line 4, respectively. That is, each of the line side voltage detectors 6U, 6V, 6W detects the line side voltage of the corresponding circuit breakers 3U, 3V, 3W, respectively. Each of the line side voltage detectors 6U, 6V, 6W outputs each of the detected phase voltages of the transmission line 4 to the overvoltage suppressing device 10, respectively.

Each of the phase voltages of the power source bus 2 detected by the power source side voltage detectors 5U, 5V, 5W and each of the phase voltages of the transmission line 4 detected by the line side voltage detectors 6U, 6V, 6W are inputted to the overvoltage suppressing device 10. In the case that the circuit breakers 3U, 3V, 3W are opened, the overvoltage suppressing device 10 closes the circuit breakers 3U, 3V, 3W based on each of the phase voltages of the power source bus 2 and each of the phase voltages of the transmission line 4, respectively.

The overvoltage suppressing device 10 is provided with a power source side voltage measuring unit 11, a line side voltage measuring unit 12, a waveform calculating unit 13, a phase detecting unit 14 and a close-signal output unit 15.

The power source side voltage measuring unit 11 measures voltages at the power source side of the circuit breakers 3U, 3V, 3W detected by the power source side voltage detectors 5U, 5V, 5W. The power source side voltage measuring unit 11 outputs measured voltage waveform data at the power source side of the circuit breakers 3U, 3V, 3W to the waveform calculating unit 13.

The line side voltage measuring unit 12 measures voltages of the transmission line 4 detected by the line side voltage detectors 6U, 6V, 6W. The line side voltage measuring unit 12 outputs measured voltage waveform data of the transmission line 4 to the waveform calculating unit 13.

The waveform calculating unit 13 performs waveform calculation processing in order to detect the phases (timing) to close the circuit breakers 3U, 3V, 3W, for the voltage waveform data of the power source bus 2 measured by the power source side voltage measuring unit 11 and the voltage waveform data of the transmission line 4 measured by the line side voltage measuring unit 12. The waveform calculating unit 13 outputs the voltage waveform data which are waveform calculation processed to the phase detecting unit 14.

The phase detecting unit 14 detects the phases to close the circuit breakers 3U, 3V, 3W, respectively, based on the voltage waveform data which are waveform calculation processed by the waveform calculating unit 13. The phase detecting unit 14 outputs the detected phases to close each phase to the close-signal output unit 15.

The close-signal output unit 15 outputs close-signal to close the circuit breakers 3U, 3V, 3W respectively at each of the phases detected by the phase detecting unit 14. Thus, closing the circuit breakers by the system of the present disclosure includes sending close-signals to the circuit breakers. Waveform calculating unit 13, phase detecting unit 14, and close-signal output unit 15 may be referred collectively as the waveform calculating device in this disclosure and may be a computer, either special or general purpose, or part of a computer or other electronic system. The waveform calculating device can include a computer-readable non-transitory storage medium that includes code that is executed by at least one processor.

Figure 2:
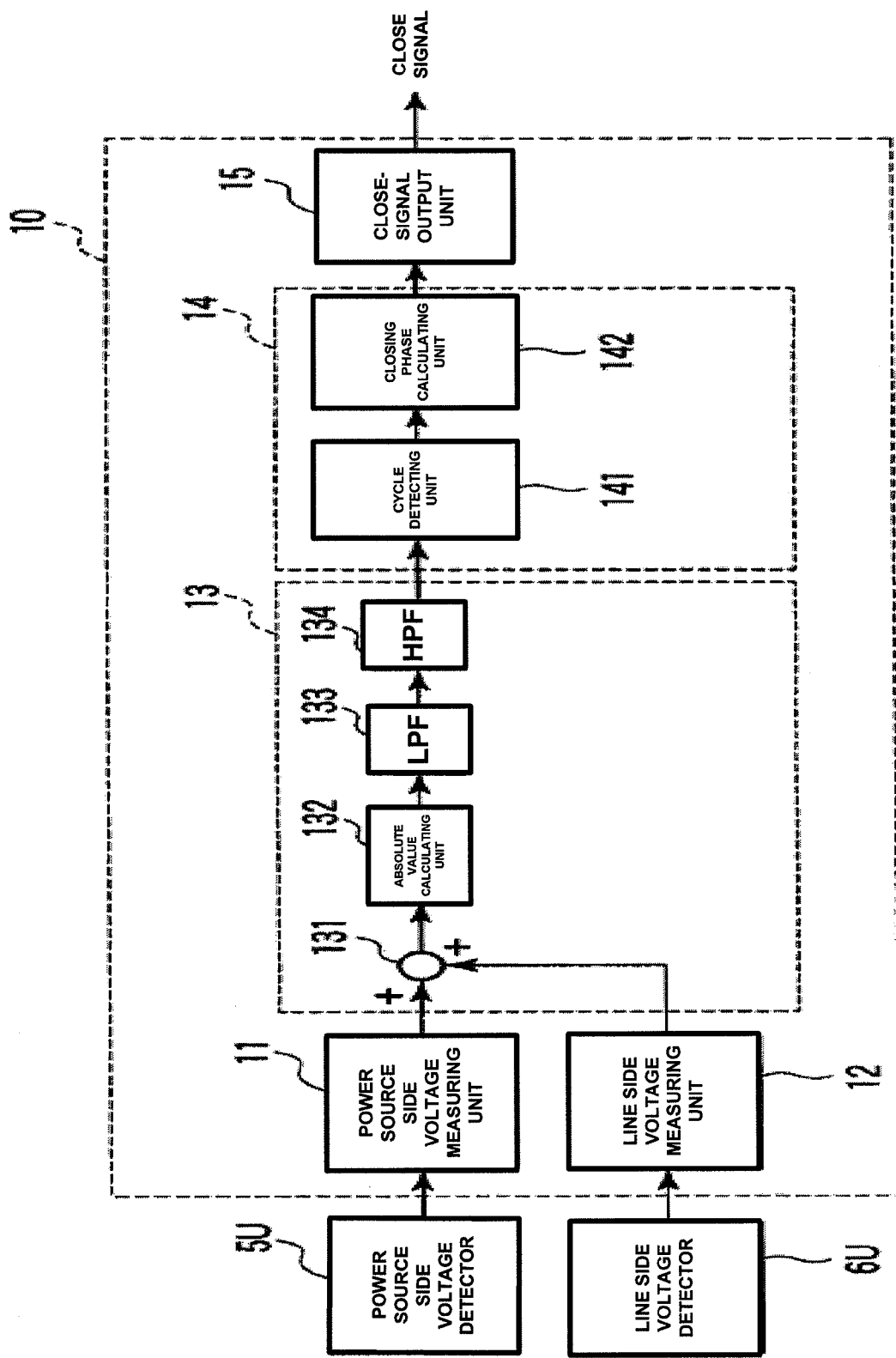
FIG. 2 A construction diagram showing a construction of the overvoltage suppressing device according to the first embodiment.

FIG. 2 is a construction diagram showing a construction of the overvoltage suppressing device 10 according to the first embodiment of the present disclosure. In addition, in FIG. 2, only the construction of one phase portion out of the circuit breakers 3U, 3V, 3W is shown, but it is assumed that the other two phase portions are constructed in the same way.

In addition, here, the construction of one phase (U phase) portion will be mainly described, and it is assumed that the other two phase portions (V phase and W phase) are constructed in the same way, so that the description thereof will be arbitrarily omitted. In the following embodiments similarly, the description of the other two phase portions will be arbitrarily omitted.

The waveform calculating unit 13 is provided with an adder 131, an absolute value calculating unit 132, a low pass filter 133 and a high pass filter 134. It may be a computer, either special or general purpose, or part of a computer or other electronic system. The waveform calculating unit 13 can include a computer-readable non-transitory storage medium that includes code that is executed by at least one processor.

The voltage waveform data at the power source side of the circuit breaker 3U which is measured by the power source side voltage measuring unit 11 and the voltage waveform data at the line side of the circuit breaker 3U which is measured by the line side voltage measuring unit 12 are inputted to the adder 131. The adder 131 adds the voltage waveform data at the power source side of the circuit breaker 3U and the voltage waveform data at the line side of the circuit breaker 3U. The adder 131 outputs the voltage waveform data calculated by addition to the absolute value calculating unit 132.

The voltage waveform data calculated by the adder 131 is inputted to the absolute value calculating unit 132. The absolute value calculating unit 132 calculates an absolute value of the inputted voltage waveform data. The absolute value calculating unit 132 outputs the voltage waveform data of the calculated absolute value to the low pass filter 133.

The voltage waveform data calculated by the absolute value calculating unit 132 is inputted to the low pass filter 133. A cutoff frequency of the low pass filter 133 is set to a frequency capable of cutting the commercial frequency. The low pass filter 133 makes only the frequency component lower than the cutoff frequency pass through for the inputted voltage waveform data. By this, the low pass filter 133 eliminates the commercial frequency component that is a high frequency component from the inputted voltage waveform data. The low pass filter 133 outputs the passed voltage waveform data to the high pass filter 134.

Here, the cutoff frequency of the low pass filter 133 will be described.

Though the frequency of the voltage oscillation of the transmission line 4 after breaking the circuit breakers 3U, 3V and 3W varies according to the compensation ratio of the installed reactor, becomes close to the commercial frequency that is the frequency of the power source side voltage. For the reason, frequency components lower than the commercial frequency are generated in the voltages between contacts of the circuit breakers 3U, 3V and 3W. Thus, the cutoff frequency of the low pass filter 133 is set to the frequency capable of cutting the commercial frequency.

The voltage waveform data which passed through the low pass filter 133 is inputted to the high pass filter 134. The cutoff frequency of the high pass filter 134 is set to a frequency capable of cutting the frequency component of the extremely low frequency wave close to the DC component. The high pass filter 134 makes only the higher frequency component than the cutoff frequency pass through for the inputted voltage waveform data. By this, the high pass filter 134 eliminates the extremely low frequency component from the inputted voltage waveform data. The high pass filter 134 outputs the passed voltage waveform data to a cycle detecting unit 141 of the phase detecting unit 14.

The phase detecting unit 14 is provided with the cycle detecting unit 141 and a closing phase calculating unit 142.

The voltage waveform data which passed through the high pass filter 134 is inputted to the cycle detecting unit 141. The cycle detecting unit 141 calculates a cycle of the times when the voltage between contacts of the circuit breaker 3U becomes minimum based on the inputted voltage waveform data. The cycle calculating unit 141 outputs the calculated cycle to the closing phase calculating unit 142.

The cycle calculated by the cycle detecting unit 141 is inputted to the closing phase calculating unit 142. The closing phase calculating unit 142 calculates the optimum time (phase) for closing the circuit breaker 3U based on the inputted cycle. Here, the optimum closing time is a time when it is estimated that the voltage waveform of the voltage between contacts of the circuit breaker 3U becomes minimum after the cycle is inputted to the closing phase calculating unit 142. The closing phase calculating unit 142 outputs the calculated time to the close-signal output unit 15.

FIG. 3~FIG. 8 are waveform diagrams showing voltage waveforms W3~W8 to describe the calculation processing in the overvoltage suppressing device 10 according the present embodiment. FIG. 3~FIG. 8 show the states of the voltage waveforms W3~W8 from the vicinity of a time t0 when the circuit breaker 3U breaks the transmission line 4, respectively. In the coordinates shown in FIG. 3~FIG. 8, it is determined that the longitudinal axis is voltage (p.u.: per unit) and the horizontal axis is time (second).

Figure 3:
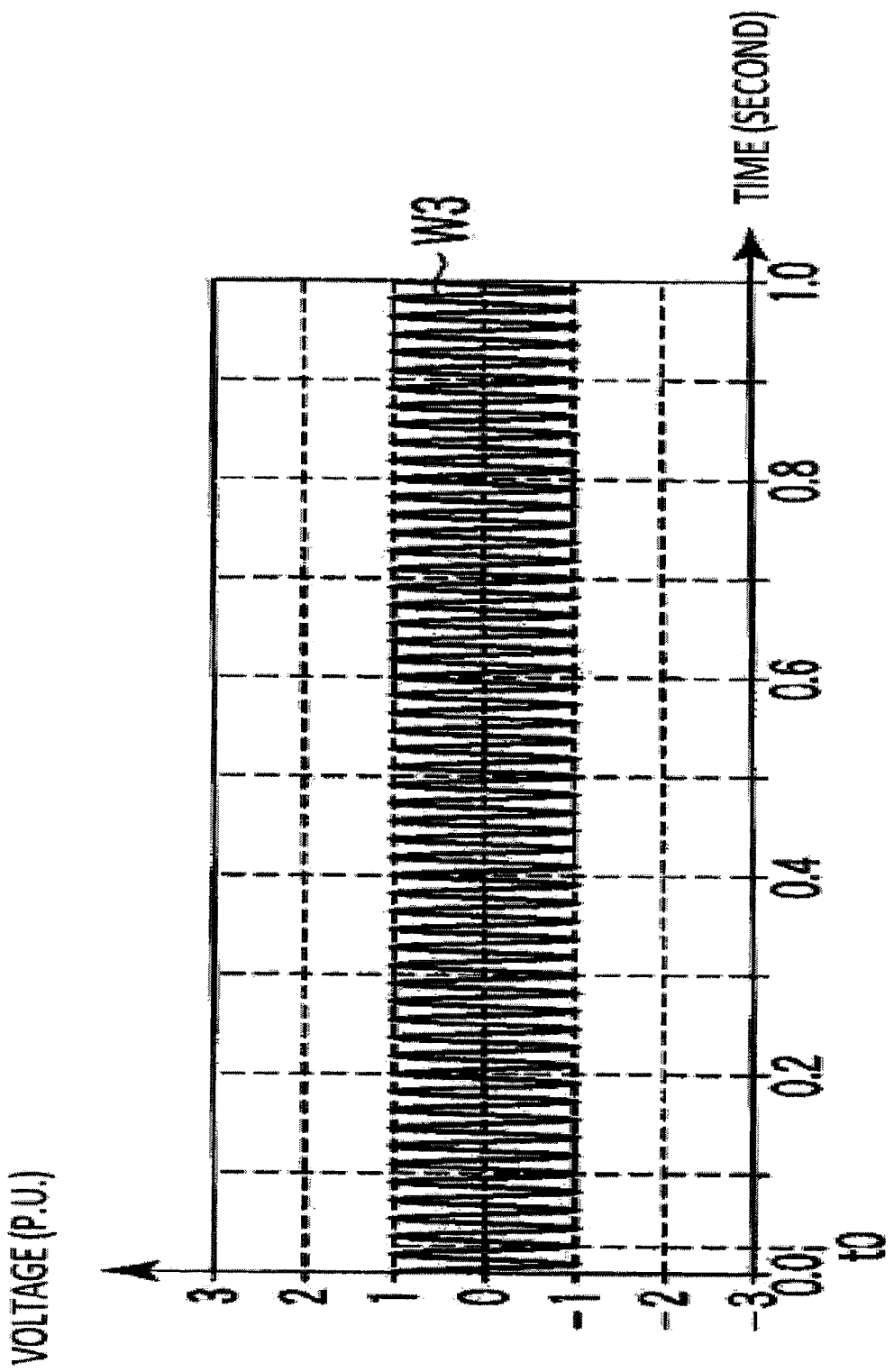
FIG. 3 A waveform diagram showing a voltage waveform of the power source side voltage of the circuit breaker which is measured by the power source side voltage measuring unit according to the first embodiment.
Figure 4:
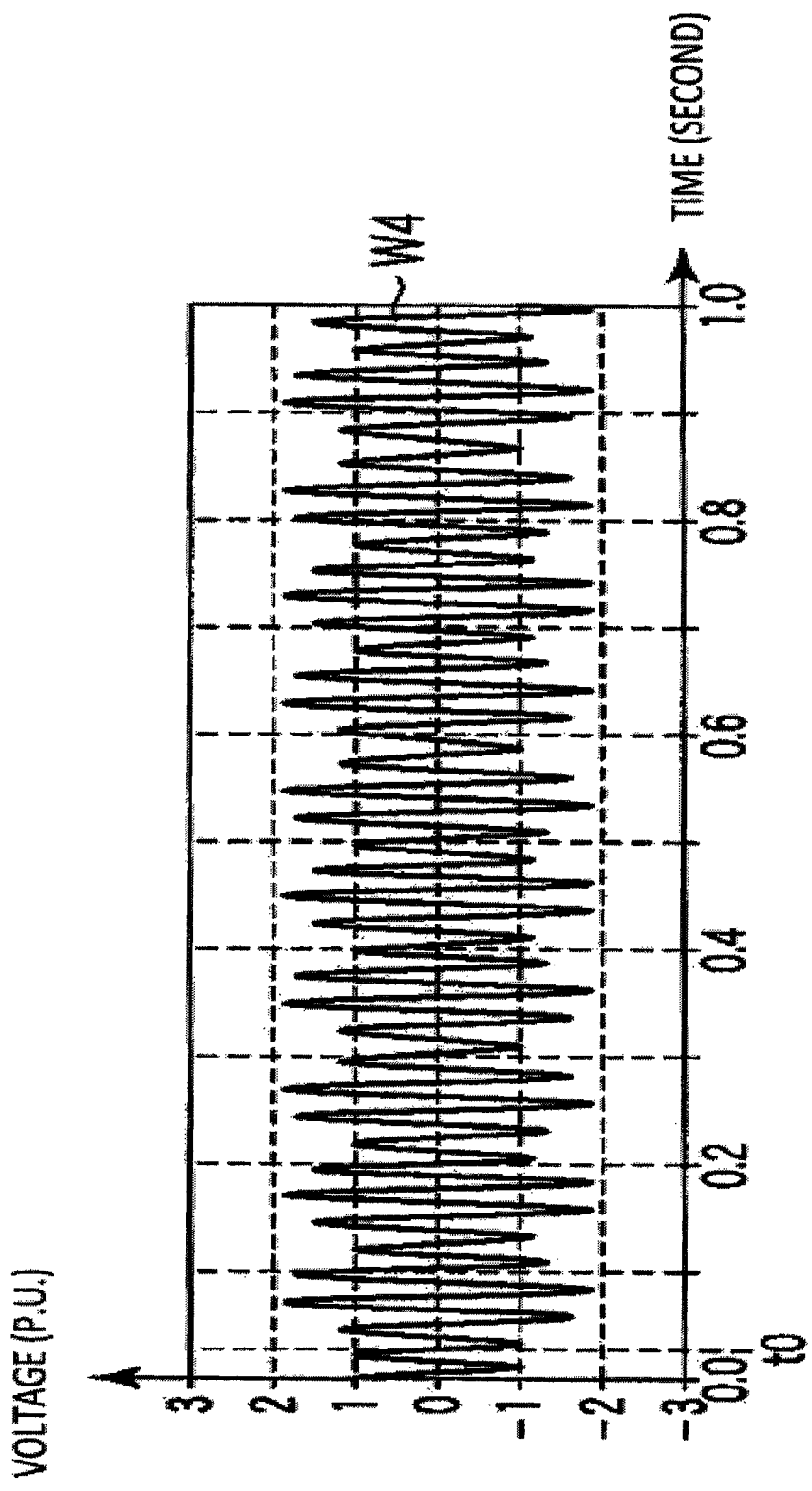
FIG. 4 A waveform diagram showing a voltage waveform of the line side voltage of the circuit breaker which is measured by the line side voltage measuring unit according to the first embodiment.
Figure 5:
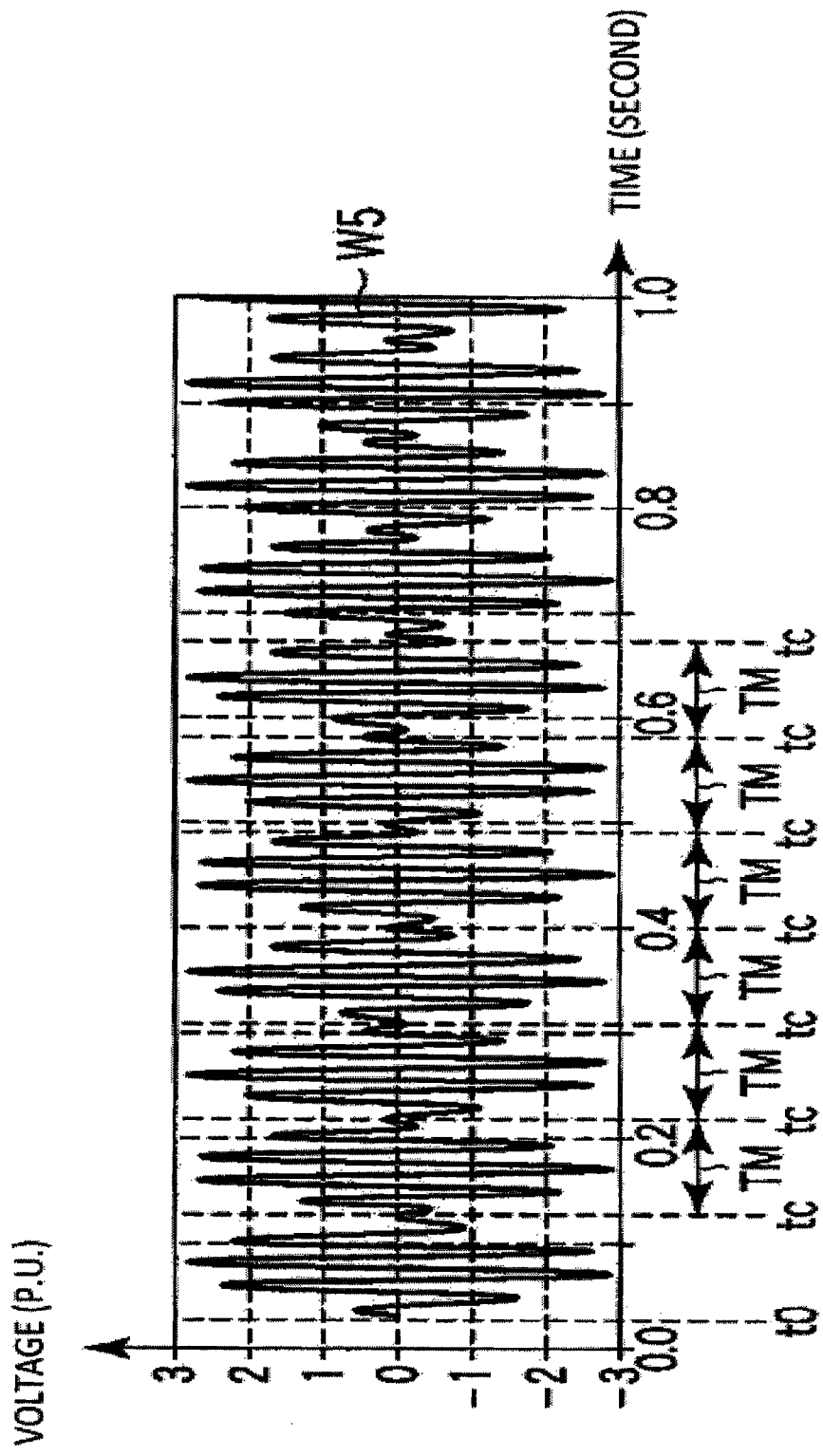
FIG. 5 A waveform diagram showing a voltage waveform of the voltage between contacts of the circuit breaker according to the first embodiment.
Figure 6:
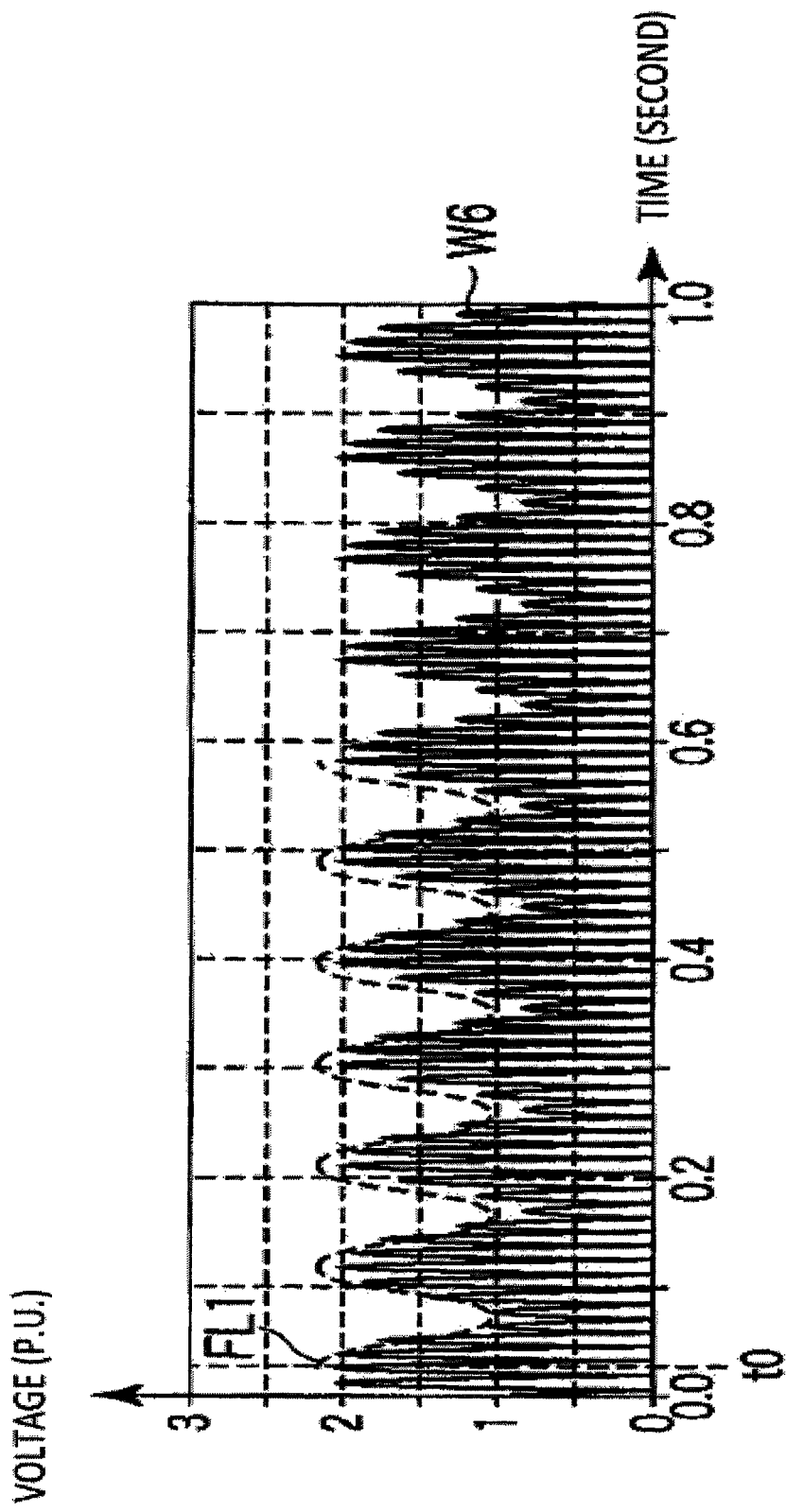
FIG. 6 A waveform diagram showing a voltage waveform which is calculation processed by the absolute value calculating unit according to the first embodiment.
Figure 7:
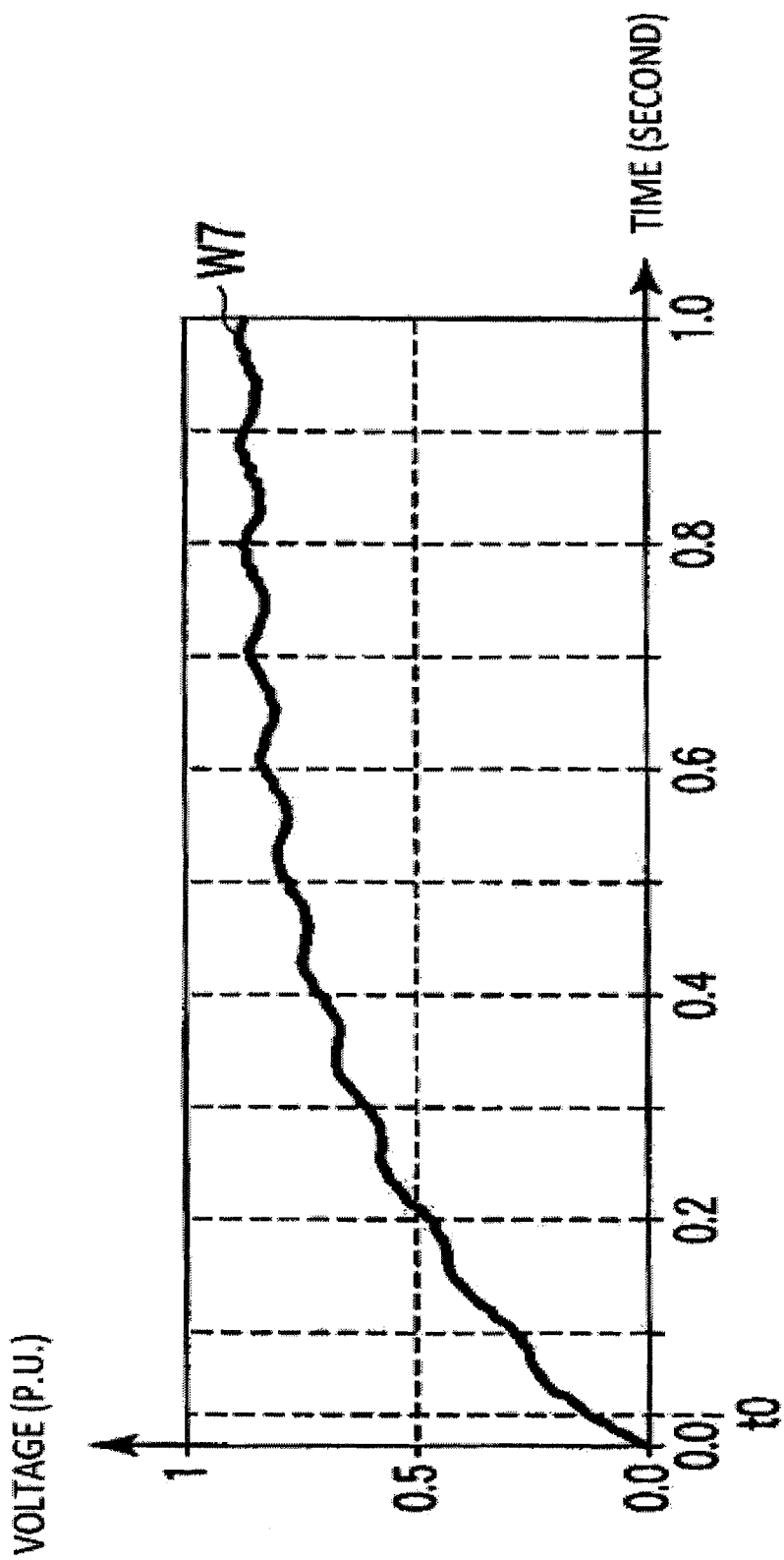
FIG. 7 A waveform diagram showing a voltage waveform which is calculation processed by the low pass filter according to the first embodiment.
Figure 8:
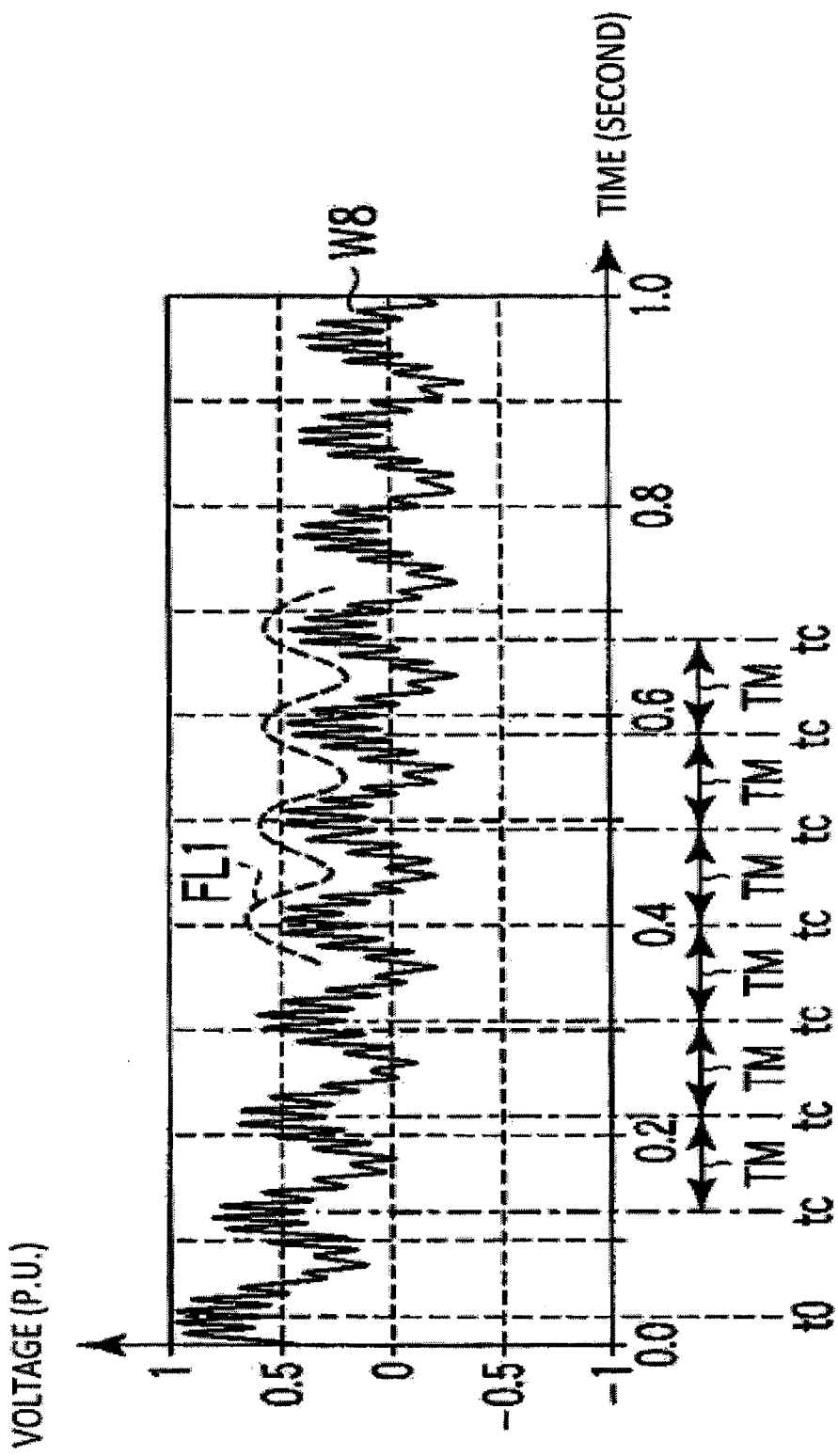
FIG. 8 A waveform diagram showing a voltage waveform which is calculation processed by the high pass filter according to the first embodiment.

FIG. 3 is the waveform diagram showing the voltage waveform W3 of the power source side voltage of the circuit breaker 3U (the voltage of the power source bus 2) which is measured by the power source side voltage measuring unit 11. FIG. 4 is the waveform diagram showing the voltage waveform W4 of the line side voltage of the circuit breaker 3U (the voltage of the transmission line 4) which is measured by the line side voltage measuring unit 12. FIG. 5 is the waveform diagram showing the voltage waveform W5 of the voltage between contacts of the circuit breaker 3U. FIG. 6 is the waveform diagram showing the voltage waveform W6 which is calculation processed by the absolute value calculating unit 132. FIG. 7 is the waveform diagram showing the voltage waveform W7 which is calculation processed by the low pass filter 133. FIG. 8 is the waveform diagram showing the voltage waveform W8 which is calculation processed by the high pass filter 134.

The voltage indicated by the voltage waveform W3 shown in FIG. 3 is applied to the power source side of the circuit breaker 3U. The voltage indicated by the voltage waveform W4 shown in FIG. 4 is applied to the line side of the circuit breaker 3U.

In this time, the voltage between contacts of the circuit breaker 3U is expressed by the voltage waveform W5 shown in FIG. 5. The voltage waveform W5 is obtained by subtracting the voltage waveform W4 at the line side of the circuit breaker 3U from the voltage waveform W3 at the power source side of the circuit breaker 3U. The voltage waveform W5 is zero before the time t0, as the voltage at the power source side of the circuit breaker 3U is the same as the voltage at the line side of the circuit breaker 3U.

The voltage waveform data at the power source side of the circuit breaker 3U indicating the voltage waveform W3 and the voltage waveform data at the line side of the circuit breaker 3U indicating the voltage waveform W4 are inputted to the adder 131. The adder 131 adds the inputted two voltage waveform data. The adder 131 outputs the added voltage waveform data to the absolute value calculating unit 132.

The voltage waveform data calculated by the adder 131 is inputted to the absolute value calculating unit 132. The absolute value calculating unit 132 calculates an absolute value of the inputted voltage waveform data. By this, the absolute value calculating unit 132 calculates the voltage waveform data indicating the voltage waveform W6 shown in FIG. 6. A low frequency component FL1 is present dominantly in the voltage waveform W6.

The voltage waveform data indicating the voltage waveform W6 calculated by the absolute value calculating unit 132 is inputted to the low pass filter 133. By this, the low pass filter 133 calculates the voltage waveform data indicating the voltage waveform W7 shown in FIG. 7. The voltage waveform W7 becomes a waveform in which, for the voltage waveform W6, the commercial frequency component is suppressed and the low frequency component FL1 including the DC component is extracted.

The voltage waveform data indicating the voltage waveform W7 calculated by the low pass filter 133 is inputted to the high pass filter 134. By this, the high pass filter 134 calculates the voltage waveform data indicating the voltage waveform W8 shown in FIG. 8.

In the voltage waveform W8, the DC component included in the voltage waveform W7 is mostly eliminated. In the voltage waveform W8, the low frequency component FL1 is present in plus and minus. In each cycle of the low frequency components FL1, a time tc when the voltage becomes maximum in the positive polarity conforms with the time tc when the voltage between contacts of the waveform W5 shown in FIG. 5 becomes small.

The voltage waveform data indicating the voltage waveform W8 which is waveform calculated by the waveform calculating unit 13 is inputted to the cycle detecting unit 141. The cycle detecting unit 141 monitors the voltage waveform data indicating the voltage waveform W8 till a preliminarily set time elapses after the circuit breaker 3U breaks the transmission line 4. The cycle detecting unit 141 detects the time tc when the voltage becomes maximum in the positive polarity in the monitored voltage waveform W8. By this detection, the cycle detecting unit 141 measures an interval between the times when the times tc are present. The cycle detecting unit 141 calculates a cycle TM based on the measured interval. The cycle detecting unit 141 outputs the calculated cycle TM to the closing phase calculating unit 142.

Here, the times tc when the voltages become maximum in the positive polarity in the voltage waveform W8 shown in FIG. 8 conform with the times tc when the voltages of the multi frequency wave of the voltage waveform W5 of the voltages between contacts shown in FIG. 5 become minimum. Thus, the cycle TM calculated by the cycle detecting unit 141 is the same as the cycle TM of the times when the voltages of the multi frequency wave of the voltage waveform W5 of the voltages between contacts become minimum.

The closing phase calculating unit 142 calculates a closing phase (closing time) which is optimum to close the circuit breaker 3U based on the cycle TM calculated by the cycle detecting unit 141. The closing phase is one of the phases when it is estimated that the voltage waveform W8 becomes maximum in the positive polarity.

The close-signal output unit 15 outputs a close-signal to the circuit breaker 3U so that the circuit breaker 3U is closed at the closing phase calculated by the closing phase calculating unit 142.

According to the present embodiment, the following operation and effect can be obtained.

By obtaining the absolute value after adding the voltage at the power source side of the circuit breaker 3U and the voltage at the line side of the circuit breaker 3U, it is possible to extract the voltage waveform data in which the low frequency component FL1 of the frequency band lower than the frequency of the power source bus 2 and higher than the frequency of the DC component is present dominantly. The low frequency components FL1 are the frequency components of the multi frequency waves of the voltage waveforms W5 of the voltages between contacts of the circuit breakers 3U, 3V, 3W. The low frequency component FL1 is extracted by the low pass filter 133 and the high pass filter 134. By obtaining the cycle TM of the times when the voltages become maximum in the positive polarity in the voltage waveform W8 in which the low frequency component FL1 is extracted, it is possible to estimate the time points when the voltages between contacts of the circuit breakers 3U, 3V, 3W become small.

By this processing, by closing the circuit breakers 3U, 3V, 3W at the optimum closing times when the voltages between contacts of the circuit breakers 3U, 3V, 3W become small, the overvoltage suppressing device 10 can suppress the overvoltages which will be generated at the time of closing the circuit breakers 3U, 3V, 3W even in the case that the voltages between contacts are in the states of the multi frequency waves.

Second Embodiment

Figure 9:
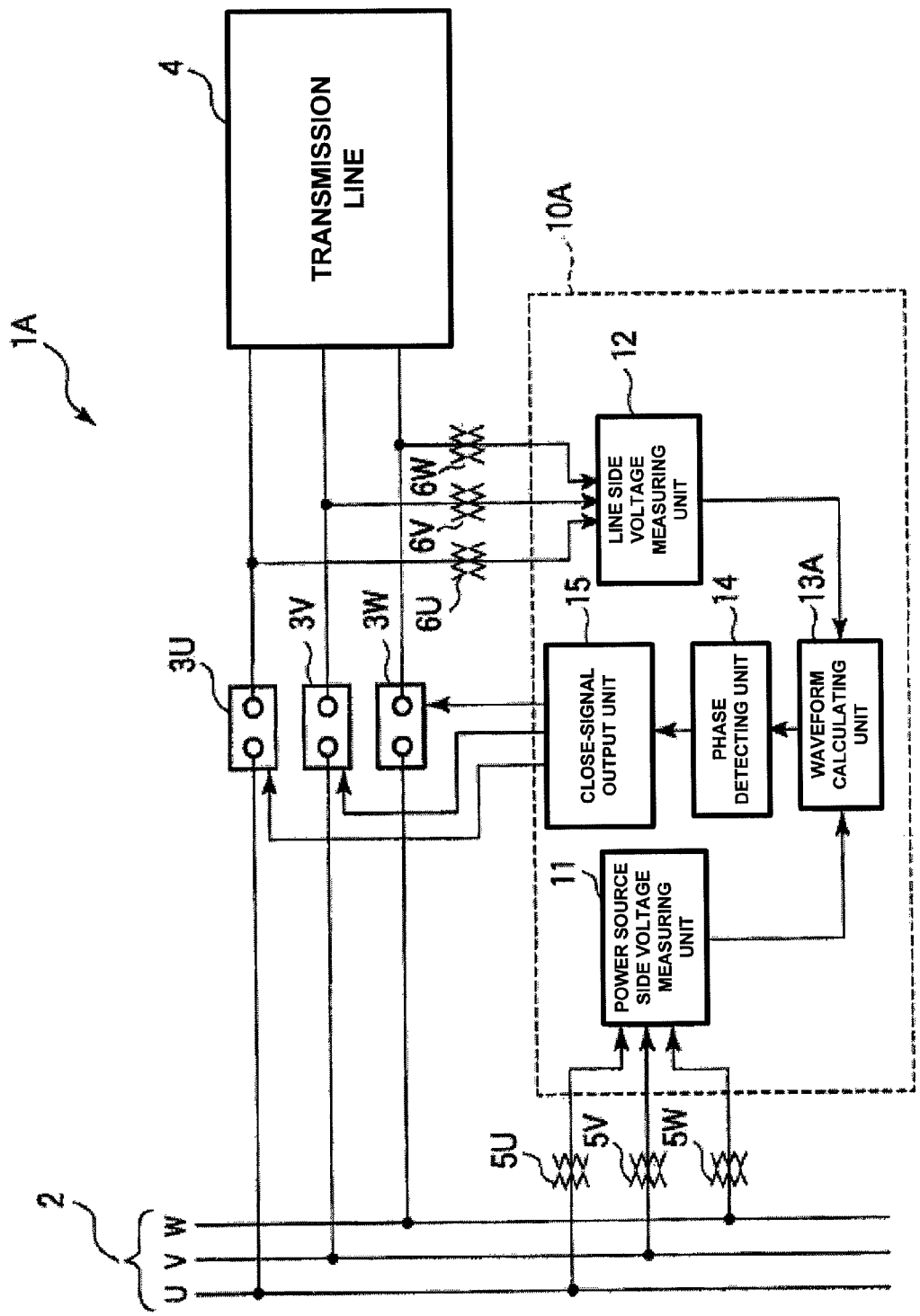
FIG. 9 A construction diagram showing a construction of a power system to which an overvoltage suppressing device according to a second embodiment of the present disclosure is applied.

FIG. 9 is a construction diagram showing a construction of a power system 1A to which an overvoltage suppressing device 10A according to a second embodiment of the present disclosure is applied.

The power system 1A has a construction in which in the power system 1 according to the first embodiment shown in FIG. 1, the overvoltage suppressing device 10A is provided in place of the overvoltage suppressing device 10. With respect to other points, the power system 1A is the same as the power system 1 according to the first embodiment.

Figure 10:
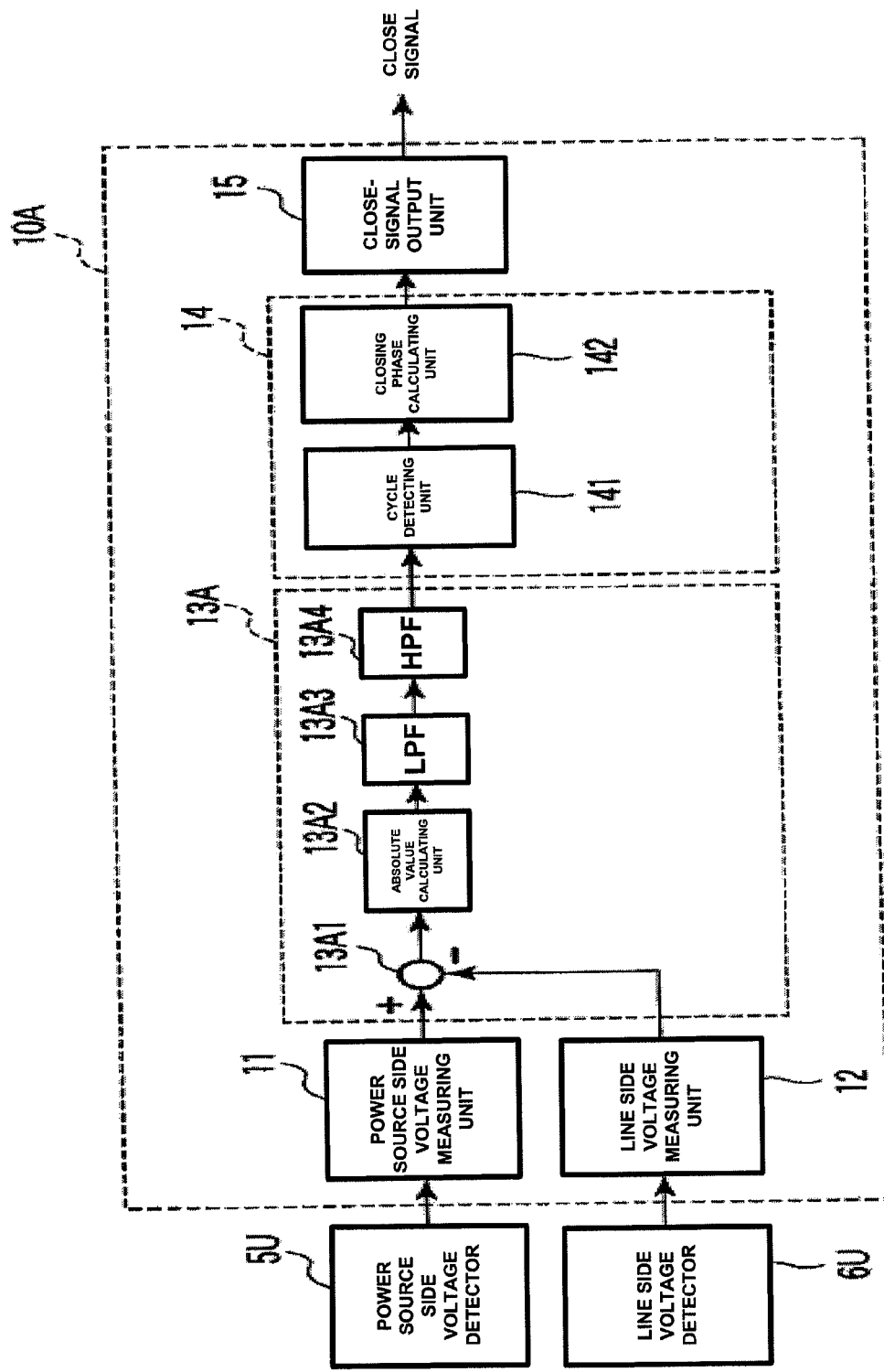
FIG. 10 A construction diagram showing a construction of the overvoltage suppressing device according to the second embodiment.

FIG. 10 is a construction diagram showing a construction of the overvoltage suppressing device 10A according to the present embodiment.

The overvoltage suppressing device 10A has a construction in which in the overvoltage suppressing device 10 according to the first embodiment shown in FIG. 2, a waveform calculating unit 13A is provided in place of the waveform calculating unit 13. With respect to other points, the overvoltage suppressing device 10A is the same as the overvoltage suppressing device 10 according to the first embodiment.

The waveform calculating unit 13A is provided with a subtractor 13A1, an absolute value calculating unit 13A2, a low pass filter 13A3 and a high pass filter 13A4.

The voltage waveform data at the power source side of the circuit breaker 3U which is measured by the power source side voltage measuring unit 11 and the voltage waveform data at the line side of the circuit breaker 3U which is measured by the line side voltage measuring unit 12 are inputted to the subtractor 13A1. The subtractor 13A1 subtracts the voltage waveform data at the line side of the circuit breaker 3U from the voltage waveform data at the power source side of the circuit breaker 3U. By the calculation, the voltage waveform data of the voltage between contacts of the circuit breaker 3U is calculated. The subtractor 13A1 outputs the calculated voltage waveform data of the voltage between contacts to the absolute value calculating unit 13A2.

The voltage waveform data of the voltage between contacts calculated by the subtractor 13A1 is inputted to the absolute value calculating unit 13A2. The absolute value calculating unit 13A2 calculates an absolute value of the inputted voltage waveform data. The absolute value calculating unit 13A2 outputs the voltage waveform data of the calculated absolute value to the low pass filter 13A3.

The voltage waveform data of the absolute value calculated by the absolute value calculating unit 13A2 is inputted to the low pass filter 13A3. A cutoff frequency of the low pass filter 13A2 is set to a frequency capable of cutting the commercial frequency. Here, with respect to the cutoff frequency, it is the same as that of the low pass filter 133 according to the first embodiment. The low pass filter 13A3 makes only the frequency component lower than the cutoff frequency pass through for the inputted voltage waveform data. By this, the low pass filter 13A3 eliminates the commercial frequency component that is a high frequency component from the inputted voltage waveform data. The low pass filter 13A3 outputs the passed voltage waveform data to the high pass filter 13A4.

The voltage waveform data which passed through the low pass filter 13A3 is inputted to the high pass filter 13A4. A cutoff frequency of the high pass filter 13A4 is set to a frequency capable of cutting the frequency component of the extremely low frequency wave close to the DC component. The high pass filter 13A4 makes only the frequency component higher than the cutoff frequency pass through for the inputted voltage waveform data. By this, the high pass filter 13A4 eliminates the extremely low frequency wave component from the inputted voltage waveform data. The high pass filter 13A4 outputs the passed voltage waveform data to the cycle detecting unit 141 of the phase detecting unit 14.

FIG. 11~FIG. 14 are waveform diagrams showing voltage waveforms to describe the calculation processing in the overvoltage suppressing device 10A according the present embodiment. FIG. 11~FIG. 14 show the states of voltage waveforms W11~W14 from the vicinity of a time t1 when the circuit breaker 3U breaks the transmission line 4, respectively. In the coordinates shown in FIG. 11~FIG. 14 it is determined that the longitudinal axis is voltage (p.u.) and the horizontal axis is time (second).

Figure 11:
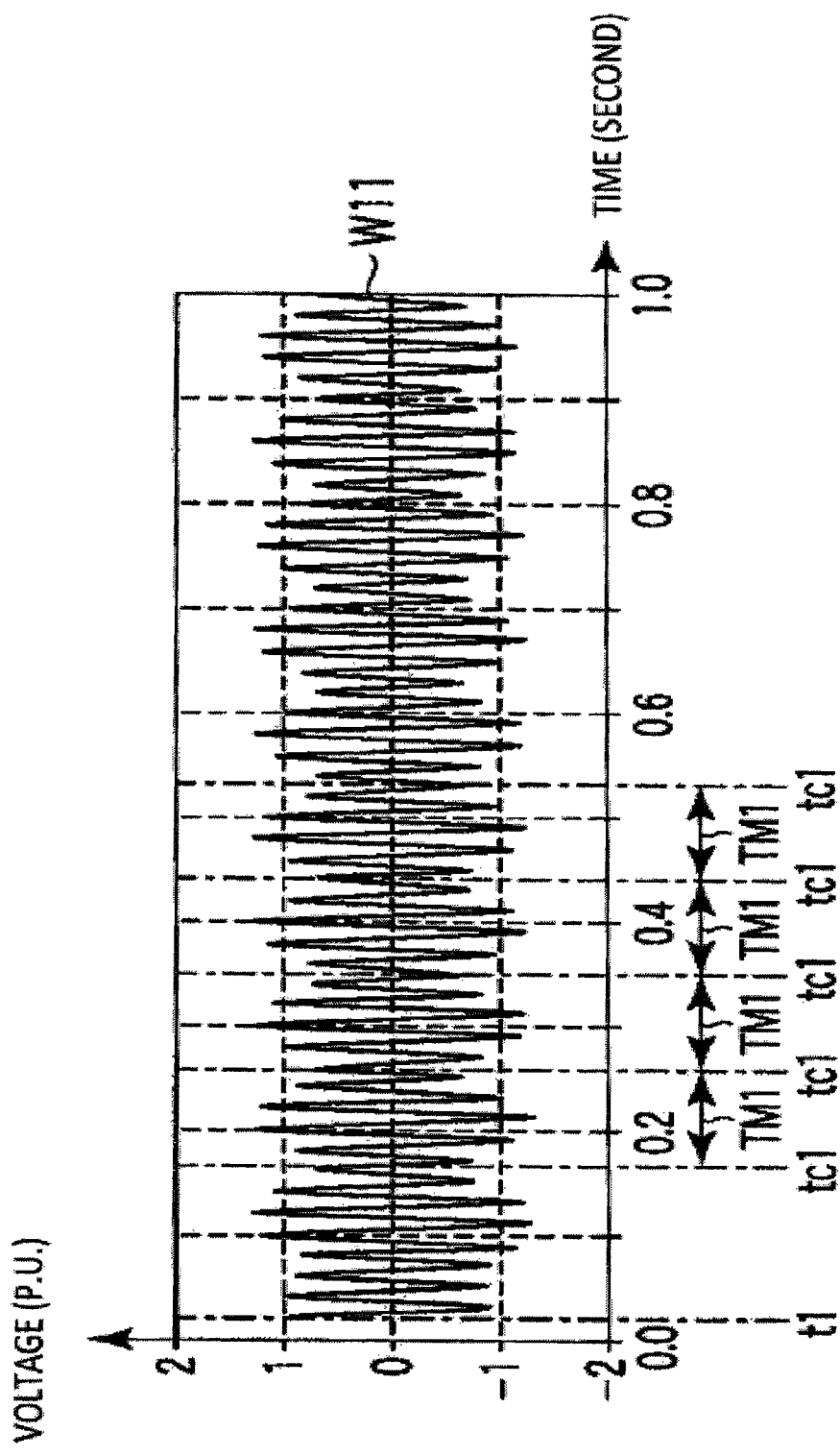
FIG. 11 A waveform diagram showing a voltage waveform of the voltage between contacts of the circuit breaker which is calculation processed by the subtractor according to the second embodiment.
Figure 12:
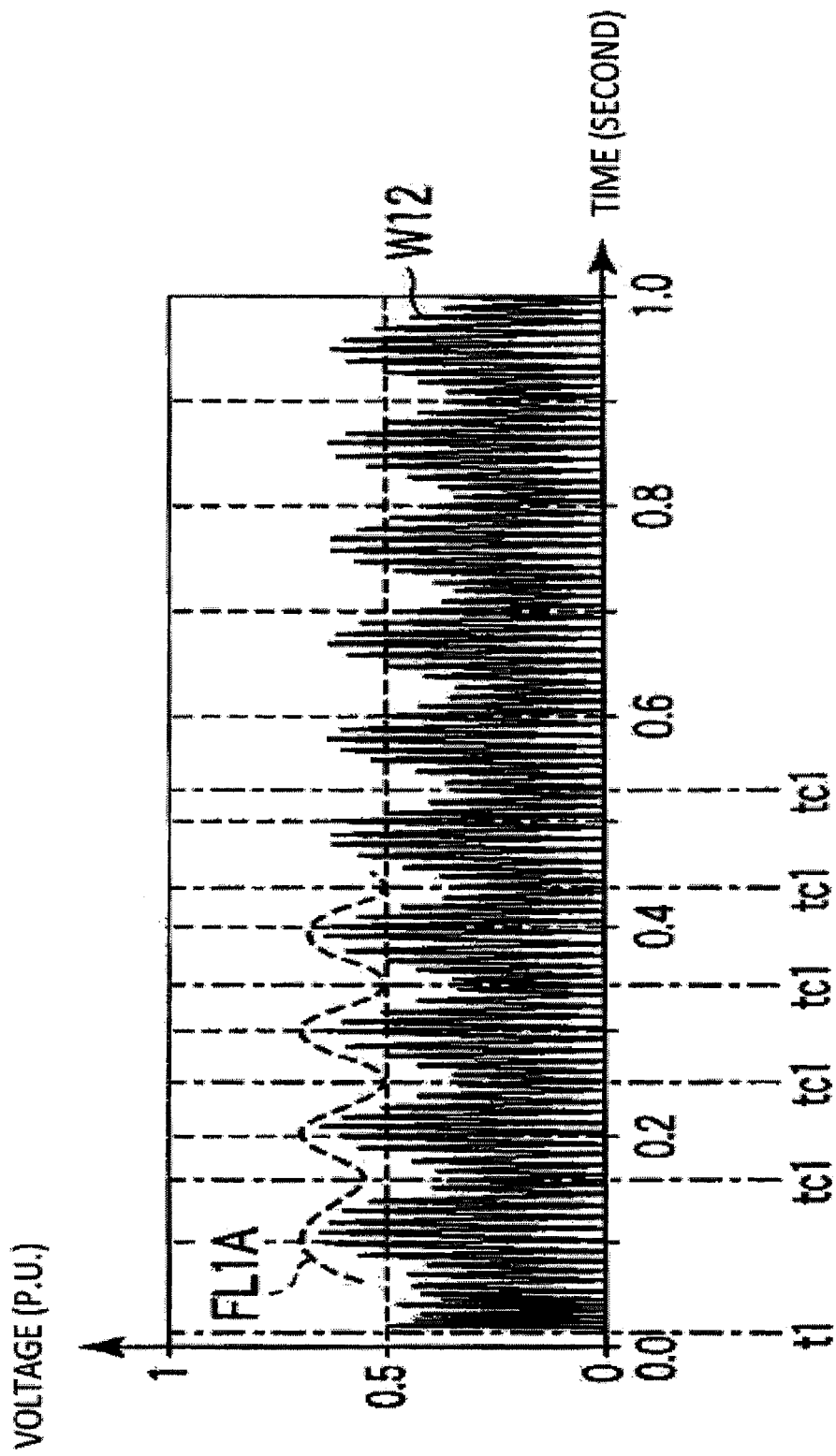
FIG. 12 A waveform diagram showing a voltage waveform which is calculation processed by the absolute value calculating unit according to the second embodiment.
Figure 13:
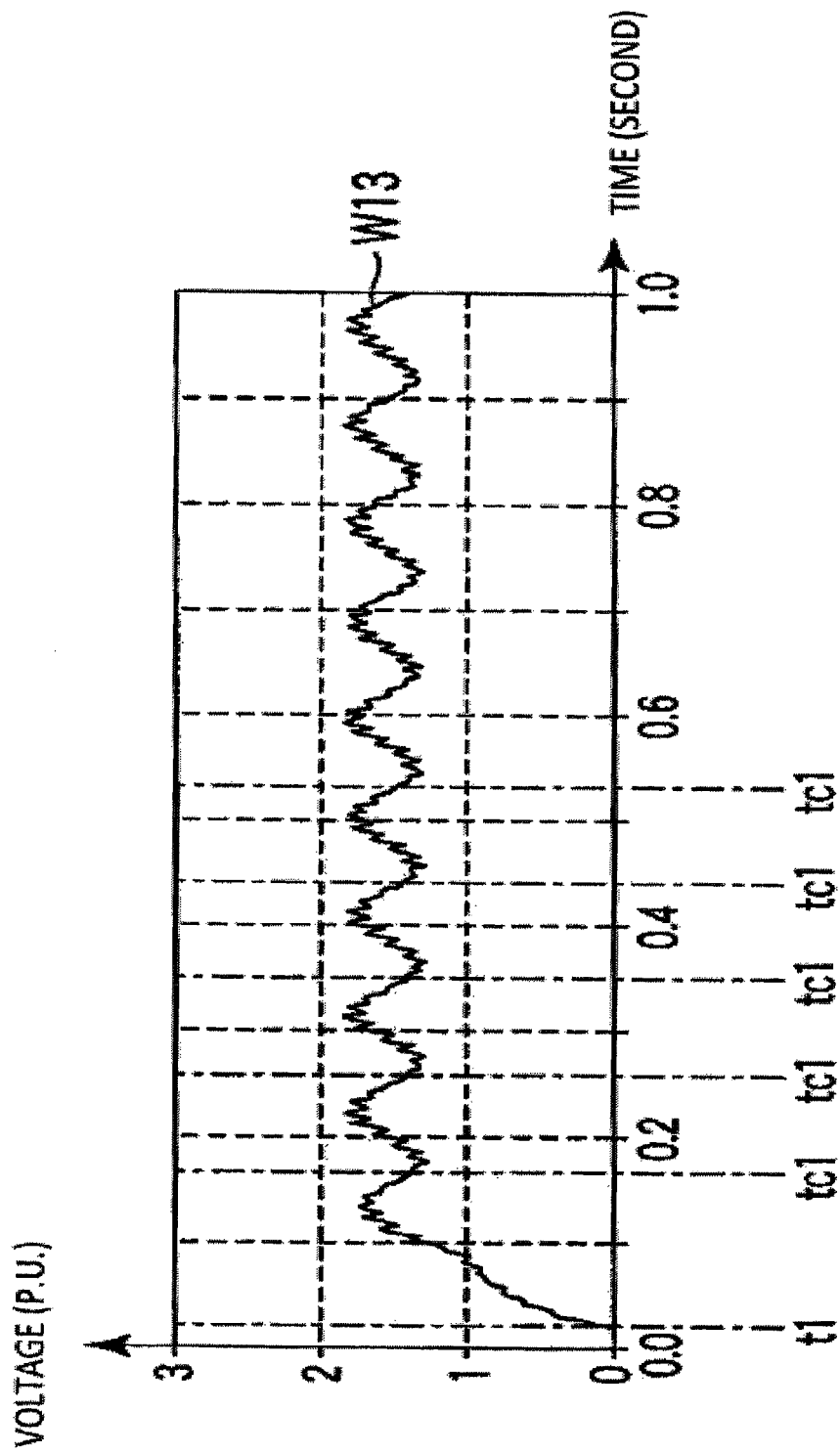
FIG. 13 A waveform diagram showing a voltage waveform which is calculation processed by the low pass filter according to the second embodiment.
Figure 14:
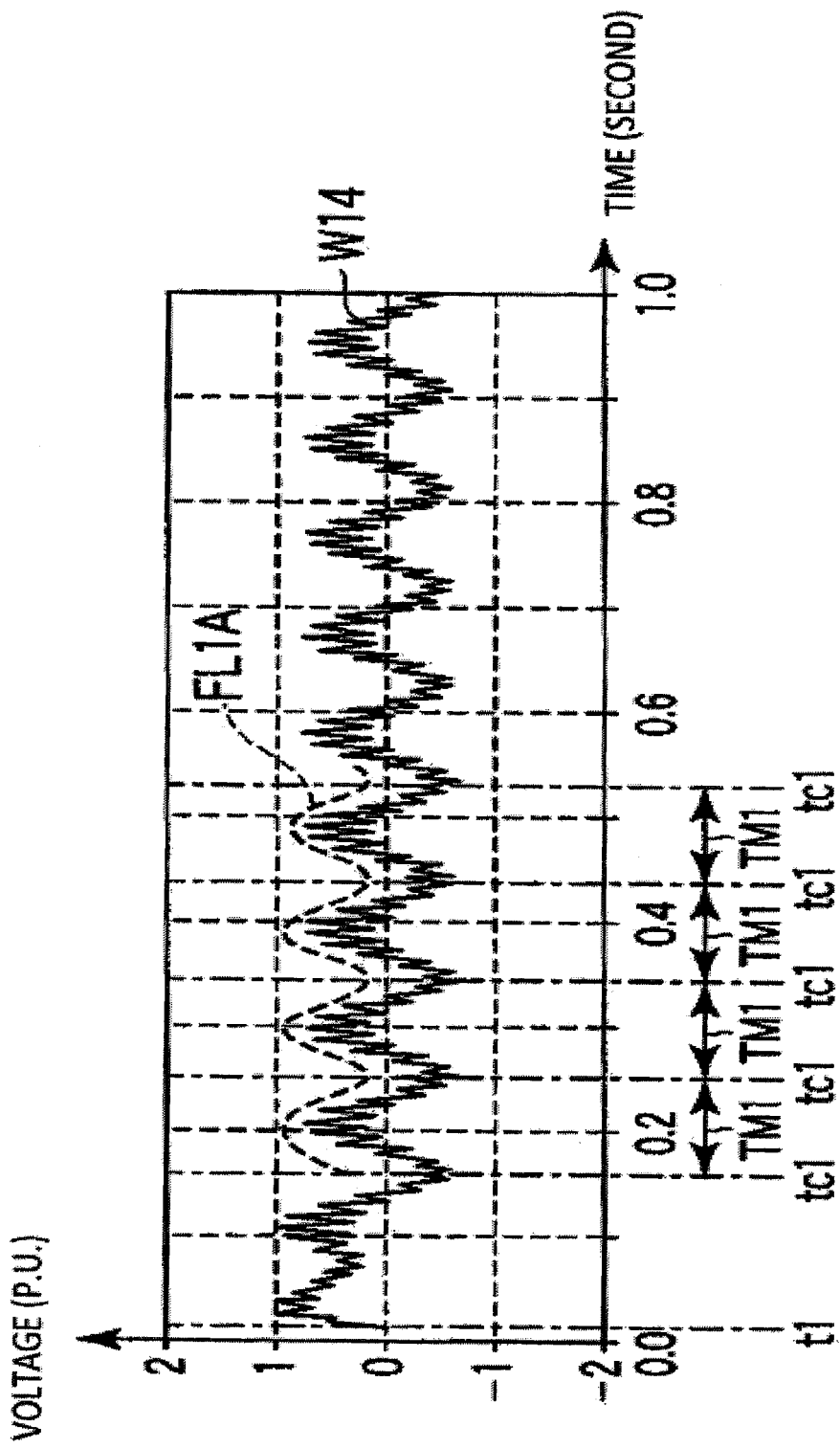
FIG. 14 A waveform diagram showing a voltage waveform which is calculation processed by the high pass filter according to the second embodiment.

FIG. 11 is the waveform diagram showing the voltage waveform W11 of the voltage between contacts of the circuit breaker 3U which is calculation processed by the subtractor 13A1. FIG. 12 is the waveform diagram showing the voltage waveform W12 which is calculation processed by the absolute value calculating unit 13A2. FIG. 13 is the waveform diagram showing the voltage waveform W13 which is calculation processed by the low pass filter 13A3. FIG. 14 is the waveform diagram showing the voltage waveform W14 which is calculation processed by the high pass filter 13A4.

The voltage waveform data at the power source side of the circuit breaker 3U and the voltage waveform data at the line side of the circuit breaker 3U are inputted to the subtractor 13A1. The subtractor 13A1 subtracts the voltage waveform data at the line side of the circuit breaker 3U from the voltage waveform data at the power source side of the circuit breaker 3U. By this, the subtractor 13A1 calculates voltage waveform data of the voltage between contacts of the circuit breaker 3U indicating the voltage waveform W11 shown in FIG. 11. The voltage waveform W11 is zero before the time t1, as the voltage at the power source side of the circuit breaker 3U is the same as the voltage at the line side of the circuit breaker 3U.

The voltage waveform data of the voltage between contacts of the circuit breaker 3U indicating the voltage waveform W11 calculated by the subtractor 13A1 is inputted to the absolute value calculating unit 13A2. The absolute value calculating unit 13A2 calculates an absolute value of the inputted voltage waveform data. By this, the absolute value calculating unit 13A2 calculates the voltage waveform data indicating the voltage waveform W12 shown in FIG. 12. Low frequency component FL1A is present dominantly in the voltage waveform W12. Here, times tc1 when the voltage of the voltage waveform W12 become small conform with the times tc1 when the voltages between contacts of the waveform W11 shown in FIG. 11 become small.

The voltage waveform data indicating the voltage waveform W12 calculated by the absolute value calculating unit 13A2 is inputted to the low pass filter 13A3. By this, the low pass filter 13A3 calculates the voltage waveform data indicating the voltage waveform W13 shown in FIG. 13. The voltage waveform W13 becomes a waveform in which, for the voltage waveform W12, the commercial frequency component is suppressed and the low frequency component FL1A including the DC component is extracted.

The voltage waveform data indicating the voltage waveform W13 calculated by the low pass filter 13A3 is inputted to the high pass filter 13A4. By this, the high pass filter 13A4 calculates the voltage waveform data indicating the voltage waveform W14 shown in FIG. 14.

In the voltage waveform W14, the DC component included in the voltage waveform W13 is mostly eliminated. In the voltage waveform W14, the low frequency components FL1A is present in plus and minus. In each cycle of the low frequency components FL1A, the time tc1 when the voltage becomes maximum in the negative polarity conforms with the time tc1 when the voltage between contacts of the waveform W11 shown in FIG. 11 becomes small.

The voltage waveform data indicating the voltage waveform W14 which is waveform calculated by the waveform calculating unit 13A is inputted to the cycle detecting unit 141. The cycle detecting unit 141 monitors the voltage waveform data indicating the voltage waveform W14 till a preliminarily set time elapses after the circuit breaker 3U breaks the transmission line 4. The cycle detecting unit 141 detects the time tc1 when the voltage becomes maximum in the negative polarity in the monitored voltage waveform W14. By this detection, the cycle detecting unit 141 measures an interval between the times when the times tc1 are present. The cycle detecting unit 141 calculates a cycle TM1 based on the measured interval. The cycle detecting unit 141 outputs the calculated cycle TM1 to the closing phase calculating unit 142.

Here, the times tc1 when the voltages become maximum in the negative polarity in the voltage waveform W14 shown in FIG. 14 conform with the times tc1 when the voltages of the multi frequency wave of the voltage waveform W11 of the voltages between contacts shown in FIG. 11 become minimum. Thus, the cycle TM1 calculated by the cycle detecting unit 141 is the same as the cycle TM1 of the times when the voltages of the multi frequency wave of the voltage waveform W11 of the voltages between contacts become minimum.

The closing phase calculating unit 142 calculates a closing phase (closing time) optimum to close the circuit breaker 3U based on the cycle TM1 calculated by the cycle detecting unit 141. The closing phase is one of the phases in which it is estimated that the voltage waveform W14 becomes maximum in the negative polarity.

The close-signal output unit 15 outputs a close-signal to the circuit breaker 3U so that the circuit breaker 3U is closed at the closing phase calculated by the closing phase calculating unit 142.

According to the present embodiment, the following operation and effect can be obtained.

By obtaining the absolute values of the voltages between contacts of the circuit breakers 3U, 3V, 3W, it is possible to extract the voltage waveform data in which the low frequency component FL1A of the frequency band lower than the frequency of the power source bus 2 and higher than the frequency of the DC component is present dominantly. The low frequency components FL1A are the frequency components of the multi frequency waves of the voltage waveforms W11 of the voltages between contacts of the circuit breakers 3U, 3V, 3W. The low frequency component FL1A is extracted by the low pass filter 13A3 and the high pass filter 13A4. By obtaining the cycle TM1 of the times when the voltages become maximum in the negative polarity in the voltage waveform W14 in which the low frequency component FL1A is extracted, it is possible to estimate the time points when the voltages between contacts of the circuit breakers 3U, 3V, 3W become small.

By these processing, by closing the circuit breakers 3U, 3V, 3W at the optimum closing times when the voltages between contacts of the circuit breakers 3U, 3V, 3W become small, the overvoltage suppressing device 10A can suppress the overvoltages which will be generated at the time of closing the circuit breakers 3U, 3V, 3W even in the case that the voltages between contacts are in the states of the multi-frequency waves.

In addition, the voltages between contacts of the circuit breakers 3U, 3V, 3W can be obtained by the subtraction of the line side voltage of the circuit breakers 3U, 3V, 3W from the power source side voltage of the circuit breakers 3U, 3V, 3W. That is, these are the same as the construction and the calculation method to calculate the transient recovery voltage (recovery voltage) after the circuit breakers 3U, 3V, 3W break the currents. For the reason, the particularly complicated calculating processing is not required for the overvoltage suppressing unit 10A.

Third Embodiment

Figure 15:
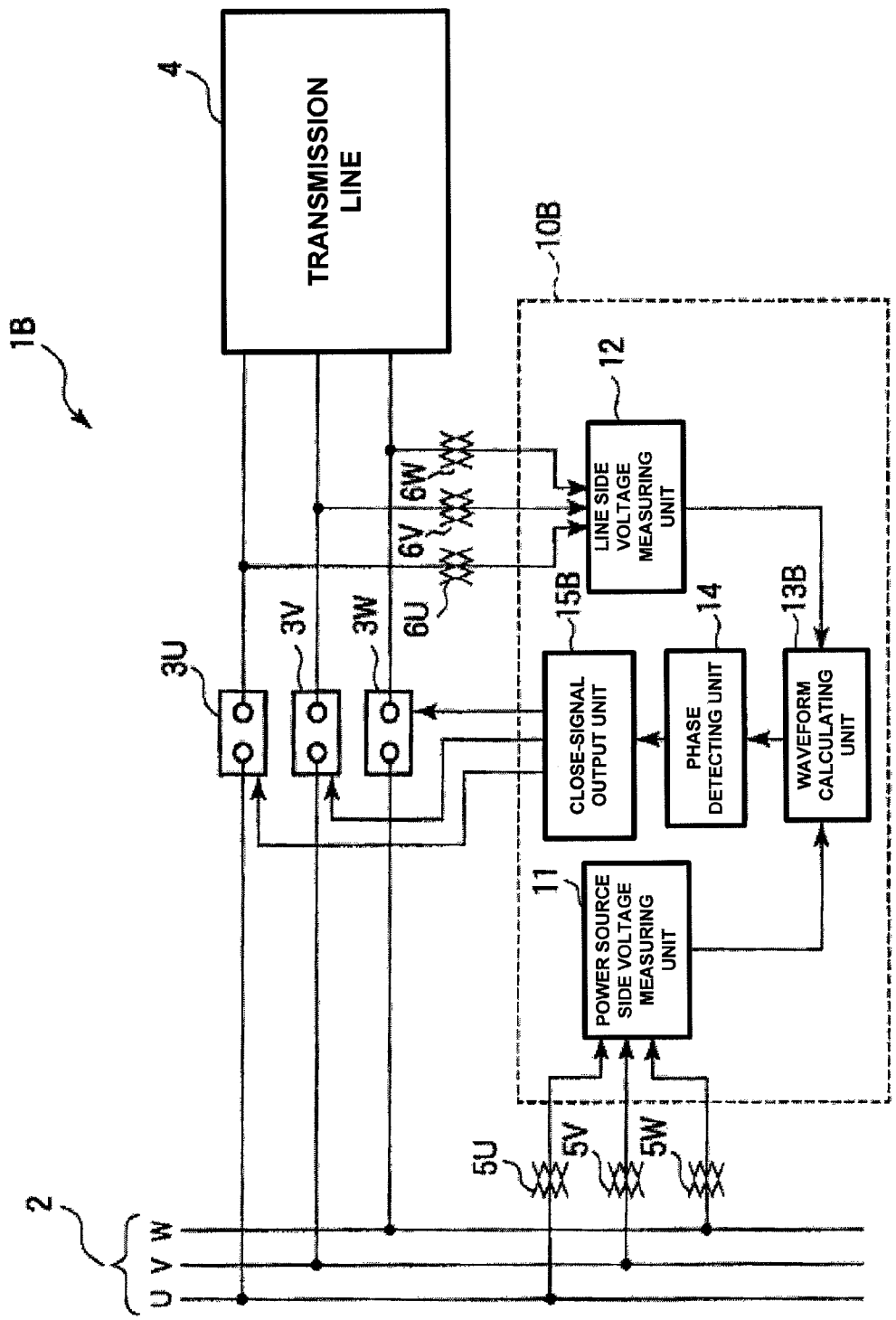
FIG. 15 A construction diagram showing the construction of a power system to which an overvoltage suppressing device according to a third embodiment of the present disclosure is applied FIG. 16 A construction diagram showing the construction of the overvoltage suppressing device according to the third embodiment.

FIG. 15 is a construction diagram showing a construction of a power system 1B to which an overvoltage suppressing device 10B according to a third embodiment of the present disclosure is applied.

The power system 1B has a construction in which in the power system 1 according to the first embodiment shown in FIG. 1, the overvoltage suppressing device 10B is provided in place of the overvoltage suppressing device 10. With respect to other points, the power system 1B is the same as the power system 1 according to the first embodiment.

Figure 16:
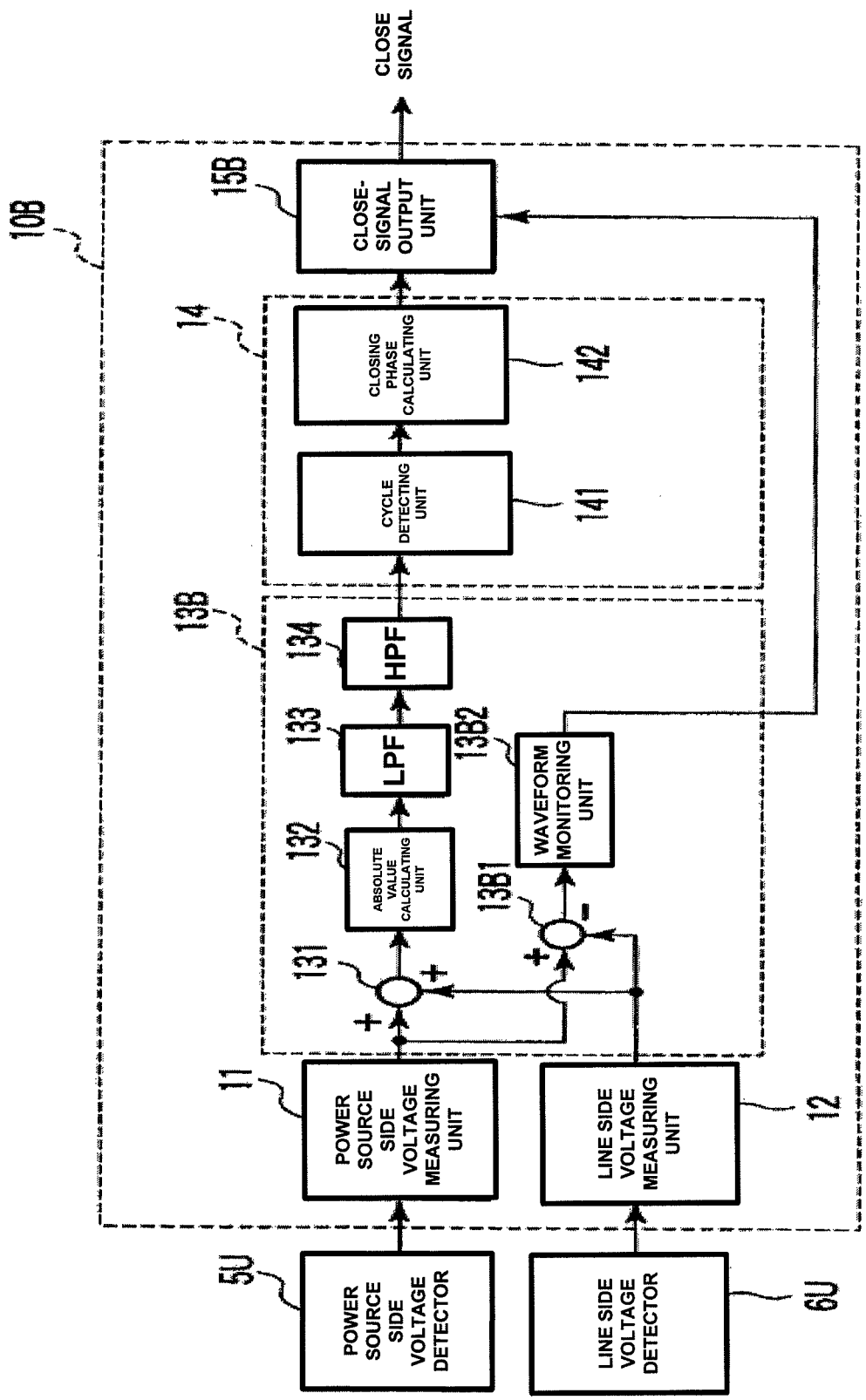

FIG. 16 is a construction diagram showing a construction of the overvoltage suppressing device 10B according to the present embodiment.

The overvoltage suppressing device 10B has a construction in which in the overvoltage suppressing device 10 according to the first embodiment shown in FIG. 2, a waveform calculating unit 13B is provided in place of the waveform calculating unit 13, and a close-signal output unit 15B is provided in place of the close-signal output unit 15. With respect to other points, the overvoltage suppressing device 10B is the same as the overvoltage suppressing device 10 according to the first embodiment.

The waveform calculating unit 13B has a construction in which a subtractor 13B1 and a waveform monitoring unit 13B2 are added to the waveform calculating unit 13 according to the first embodiment.

The voltage waveform data at the power source side of the circuit breaker 3U which is measured by the power source side voltage measuring unit 11 and the voltage waveform data at the line side of the circuit breaker 3U which is measured by the line side voltage measuring unit 12 are inputted to the subtractor 13B1. The subtractor 13B1 subtracts the voltage waveform data at the line side of the circuit breaker 3U from the voltage waveform data at the power source side of the circuit breaker 3U. By the calculation, the voltage waveform data of the voltage between contacts of the circuit breaker 3U is calculated. The subtractor 13B1 outputs the calculated voltage waveform data of the voltage between contacts to the waveform monitoring unit 13B2.

The voltage waveform data of the voltage between contacts calculated by the subtractor 13B1 is inputted to the waveform monitoring unit 13B2. The waveform monitoring unit 13B2 monitors whether or not a secondary arc current flowing through the line side (transmission line 4) of the circuit breaker 3U is extinguished within a preliminarily set time (100 milliseconds, for example), after breaking the transmission line 4 by the circuit breaker 3U, based on the voltage waveform data of the voltage between contacts.

A method for judging the arc extinction of the secondary arc by the waveform monitoring unit 13B2 is performed by detecting that the waveform of the voltage between contacts has changed. With respect to the method for detecting the change in the waveform of the voltage between contacts, there is a method to judge that by the frequency of the voltage between contacts, for example. While the secondary arc is not extinguished, the voltage at the line side of the circuit breaker 3U is zero. For the reason, the voltage between contacts becomes the same as the voltage (commercial frequency, for example) at the power source side of the circuit breaker 3U. In addition, in the case that the inductors are provided at the transmission line side, when the secondary arc is extinguished, the voltage between contacts becomes in the state of a frequency lower than the frequency at the power source side of the circuit breaker 3U. Thus, the waveform monitoring unit 13B2 can judge that the secondary arc is extinguished by detecting that the frequency of the voltage between contacts becomes lower.

The waveform monitoring unit 13B2 finishes the calculation processing in the case that the secondary arc is extinguished within the set time. In the case that the secondary arc is not extinguished within the set time, the waveform monitoring unit 13B2 performs the calculation processing to close the circuit breaker 3U while suppressing the closing surge (overvoltage), based on the voltage waveform data of the voltage between contacts, without performing the waveform processing by the calculation of the adder 131 and so on. The waveform monitoring unit 13B2 outputs the close-signal to the close-signal output unit 15B based on the calculation result.

Here, the secondary arc current will be described.

Generally, it is known that when a fault is generated in the transmission line, and after the circuit breaker breaks the transmission line, a small current flows through the fault point by the induction from the sound phase or sound line. This current is called as the secondary arc current. It is said that the secondary arc will be extinguished naturally in several ten milliseconds through about several hundred milliseconds after the circuit breaker breaks the transmission line. While the secondary arc current flows, the fault is continuing. Though the arc voltage due to the secondary arc current exists during this time, as its magnitude is smaller compared with that of the power source voltage, the voltage of the transmission line is about zero even if the circuit breaker breaks the transmission line. When the secondary arc is extinguished, the voltage oscillation in the transmission line takes place. Thus, the waveform monitoring unit 13B2 judges that the secondary arc is extinguished by detecting that the voltage at the line side of the circuit breaker 3U becomes not zero.

Next, the set time which is set by the waveform monitoring unit 13B2 will be described.

In Standard Specification JEC-2300-1998 (AC Circuit Breaker) of JEC (Japanese Electrotechnical Committee) in IEEJ (The Institute of Electrical Engineers of Japan), the operating duty of the circuit breaker is determined. In the Specification, the duty that is Breaking–θ–Closing·Breaking–(one minute)–Closing·Breaking is determined for the circuit breaker in the case of high speed reclosing. Here, it is determined as the standard that θ is 0.35 second.

On the other hand, as a time till the secondary arc is extinguished after the circuit breaker 3U is opened depends on the weather condition, it is not constant. Thus the extinguishing time point of the secondary arc is delayed, there may be a case that it becomes difficult to estimate the time point when the voltage between contacts become small by the waveform processing within the time θ of the above-described high speed reclosing.

For the reason, in the waveform monitoring unit 13B2, the maximum time which can be consumed till the secondary arc is extinguished after the circuit breaker 3U is opened is set as the set time, within the time when the circuit breaker 3U can be closed within the time of θ, even if the time point when the voltage between contacts becomes small is estimated by the waveform processing. That is, this means that if the overvoltage suppressing device 10B estimates the time point when the voltage between contacts becomes small by the waveform processing, in the case that the time till the secondary arc is extinguished is required longer than the set time, the circuit breaker can not be reclosed within the time θ required for the above-described operating duty.

If the secondary arc is extinguished within the set time, the overvoltage suppressing device 10B performs the waveform processing, and estimates the time point when the voltage between contacts becomes small. In the case that the secondary arc is not extinguished within the set time, the overvoltage suppressing device 10B closes the circuit breaker 3U at the closing time point which is calculated by the waveform monitoring unit 13B2.

Figure 17:
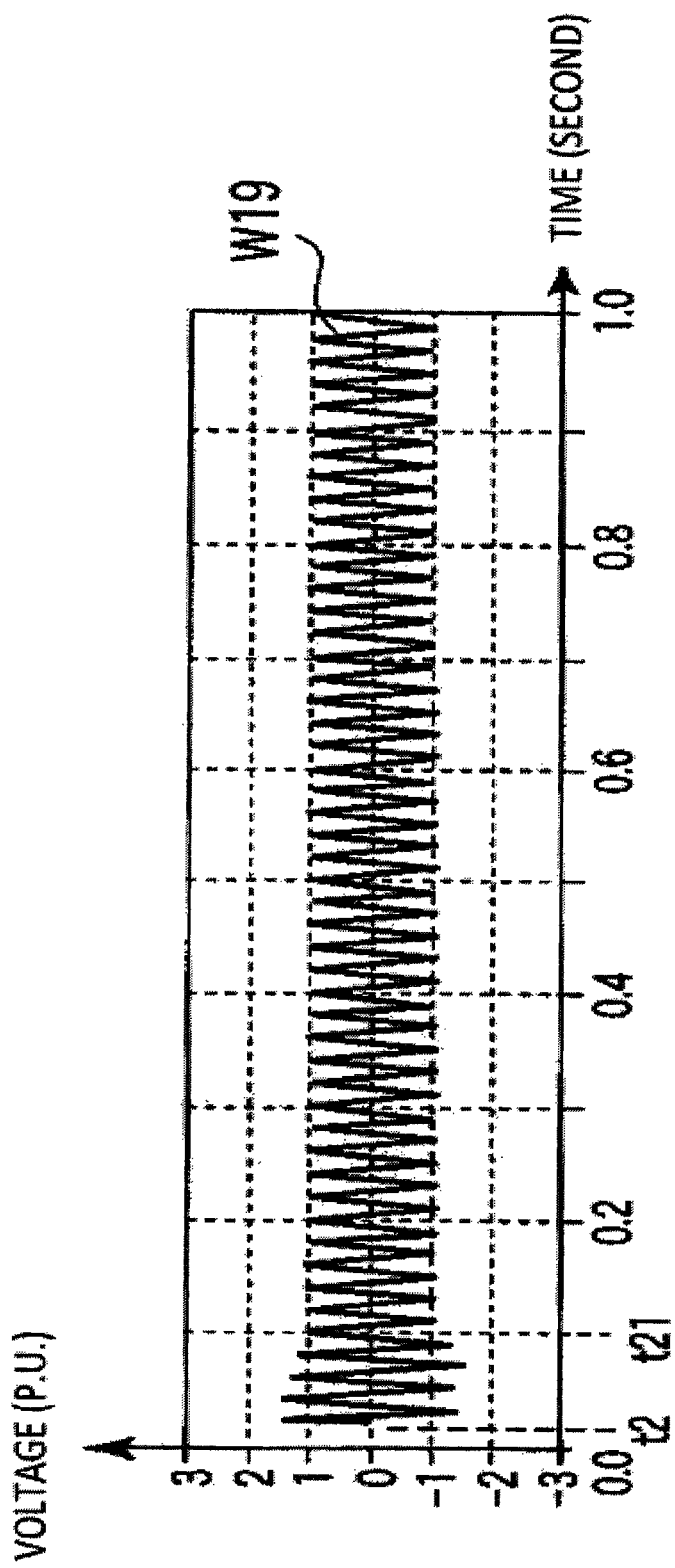
FIG. 17 A waveform diagram showing a voltage waveform of the power source side voltage of the circuit breaker which is measured by the power source side voltage measuring unit according to the third embodiment.
Figure 18:
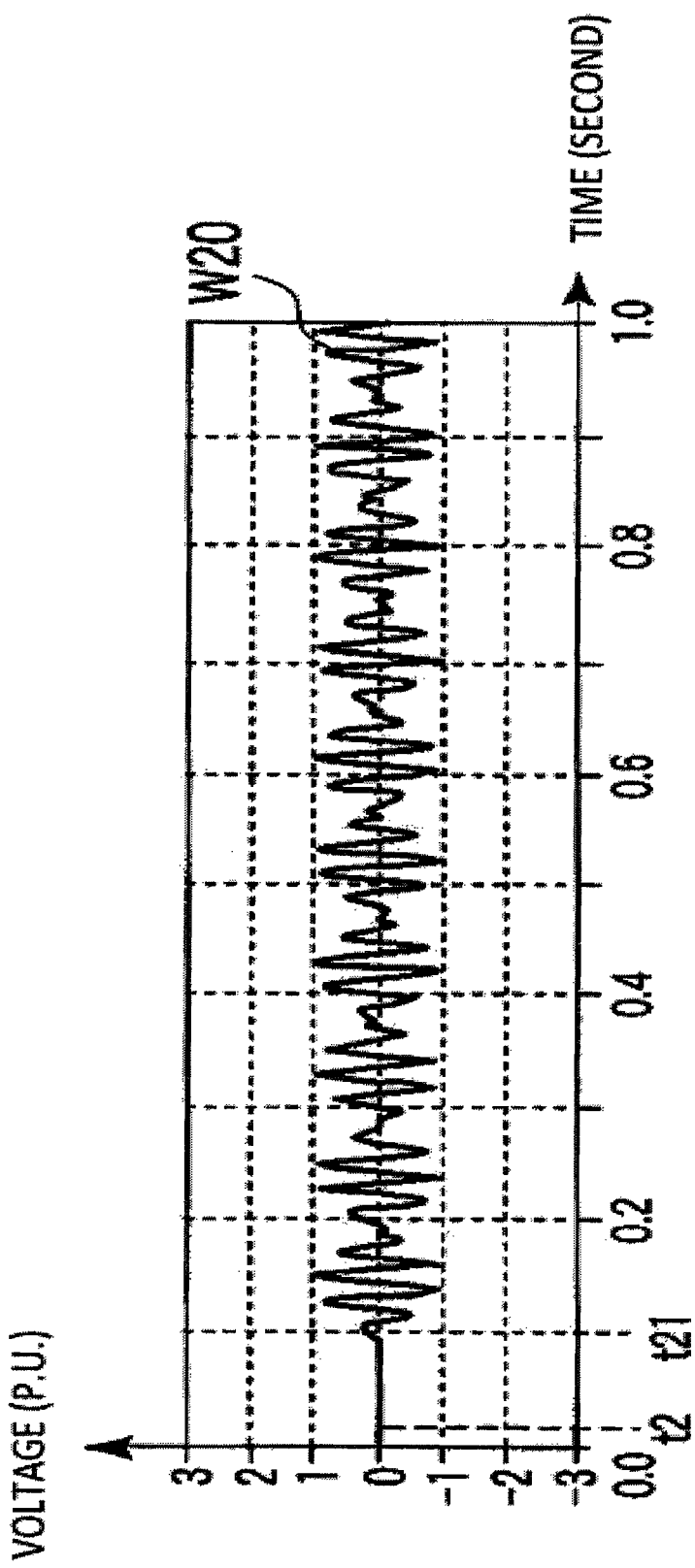
FIG. 18 A waveform diagram showing a voltage waveform of the line side voltage of the circuit breaker which is measured by the line side voltage measuring unit according to the third embodiment.
Figure 19:
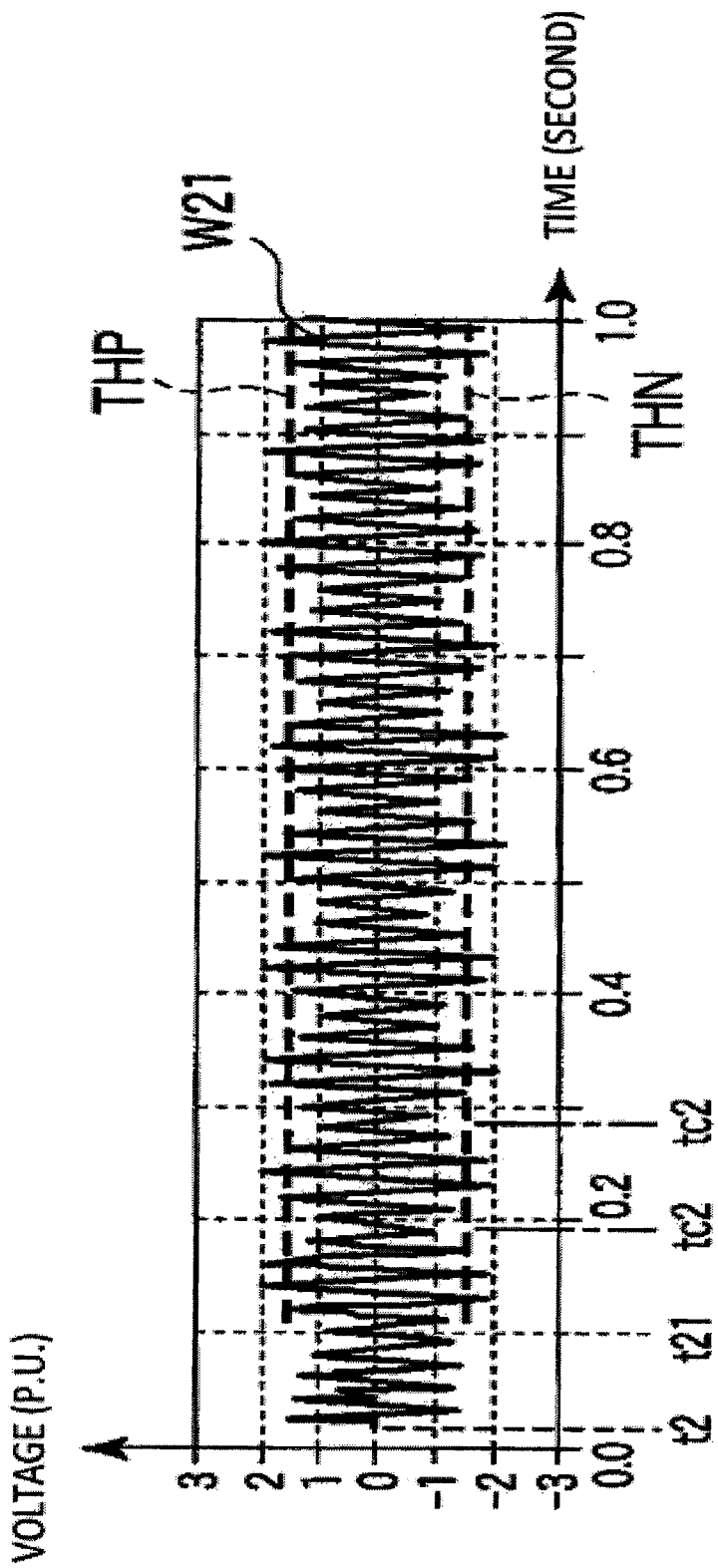
FIG. 19 A waveform diagram showing a voltage waveform which is calculation processed by the subtractor according to the third embodiment.

FIG. 17~FIG. 19 are waveform diagrams showing the voltage waveforms to describe the calculation processing in the overvoltage suppressing device 10B according the present embodiment. FIG. 17~FIG. 19 show the states of the voltage waveforms W19~W21 from the vicinity of a time t2 when the circuit breaker 3U breaks the transmission line 4, respectively. In the coordinates shown in FIG. 17~FIG. 19 it is determined that the longitudinal axis is voltage (p.u.) and the horizontal axis is time (second).

FIG. 17 is the waveform diagram showing the voltage waveform W19 of the power source side voltage (the voltage of the power source bus 2) of the circuit breaker 3U which is measured by the power source side voltage measuring unit 11. FIG. 18 is the waveform diagram showing the voltage waveform W20 of the line side voltage (the voltage of the transmission line 4) of the circuit breaker 3U which is measured by the line side voltage measuring unit 12. FIG. 19 is the waveform diagram showing the voltage waveform W21 of the voltage between contacts of the circuit breaker 3U which is calculation processed by the subtractor 13B1.

The voltage indicated by the voltage waveform W19 shown in FIG. 17 is applied to the power source side of the circuit breaker 3U. The voltage indicated by the voltage waveform W20 shown in FIG. 18 is applied to the line side of the circuit breaker 3U.

In FIG. 17 and FIG. 18, it is assumed that the U phase of the transmission line is in one line ground-fault state. For the reason, the power source side voltage W19 and the line side voltage W20 are zero before the time t2 of FIG. 17 and FIG. 18. As the circuit breaker 3U breaks the transmission line 4 at the time t2, after this time the power source voltage is present in the power source side voltage W19. On the other hand, the fault of the transmission line 4 continues till a time t21. That is, the secondary arc voltage continues till the time t21. The time t21 indicates the time point when the secondary arc is extinguished. Thus, the voltage waveform W20 indicating the voltage of the transmission line 4 is zero till the time t21.

The voltage waveform data at the power source side of the circuit breaker 3U indicating the voltage waveform W19 and the voltage waveform data at the line side of the circuit breaker 3U indicating the voltage waveform W20 are inputted to the subtractor 13B1. The subtractor 13B1 subtracts the voltage waveform data at the line side of the circuit breaker 3U from the voltage waveform data at the power source side of the circuit breaker 3U. By this, the subtractor 13B1 calculates voltage waveform data of the voltage between contacts of the circuit breaker 3U indicating the voltage waveform W21 shown in FIG. 19. The voltage waveform W21 is zero before the time t2, as the voltage at the power source side of the circuit breaker 3U is the same as the voltage at the line side of the circuit breaker 3U.

The voltage waveform data of the voltage between contacts of the circuit breaker 3U indicating the voltage waveform W21 which is calculated by the subtractor 13B1 and the voltage waveform data at the line side of the circuit breaker 3U indicating the voltage waveform W20 are inputted to the waveform monitoring unit 13B2. The waveform monitoring unit 13B2 measures a time from the time t2 when the circuit breaker 3U is opened to the time t21 when the secondary arc is extinguished.

The waveform monitoring unit 13B2 finishes the calculation processing when the time from the time t2 when the circuit breaker 3U is opened to the time t21 when the secondary arc is extinguished is shorter than the set time.

In the case that the time from the time t2 when the circuit breaker 3U is opened to the time t21 when the secondary arc is extinguished is longer than the set time, the waveform monitoring unit 13B2 detects a time point tc2 when the voltage value of the voltage waveform data of the voltage between contacts of the circuit breaker 3U indicating the voltage waveform W21 is lower than preliminarily set voltage threshold values THP, THN of the instantaneous value (here, assumed to be ±1.5 p.u.). The waveform monitoring unit 13B2 outputs the close-signal to the close-signal output unit 15B, so that the circuit breaker 3U is closed in the condition that the voltage between contacts of the circuit breaker 3U is not more than 1.5 p.u. of the wave height value of the power source voltage in the stationary time.

Here, closing surge VS will be described.

Figure 20:
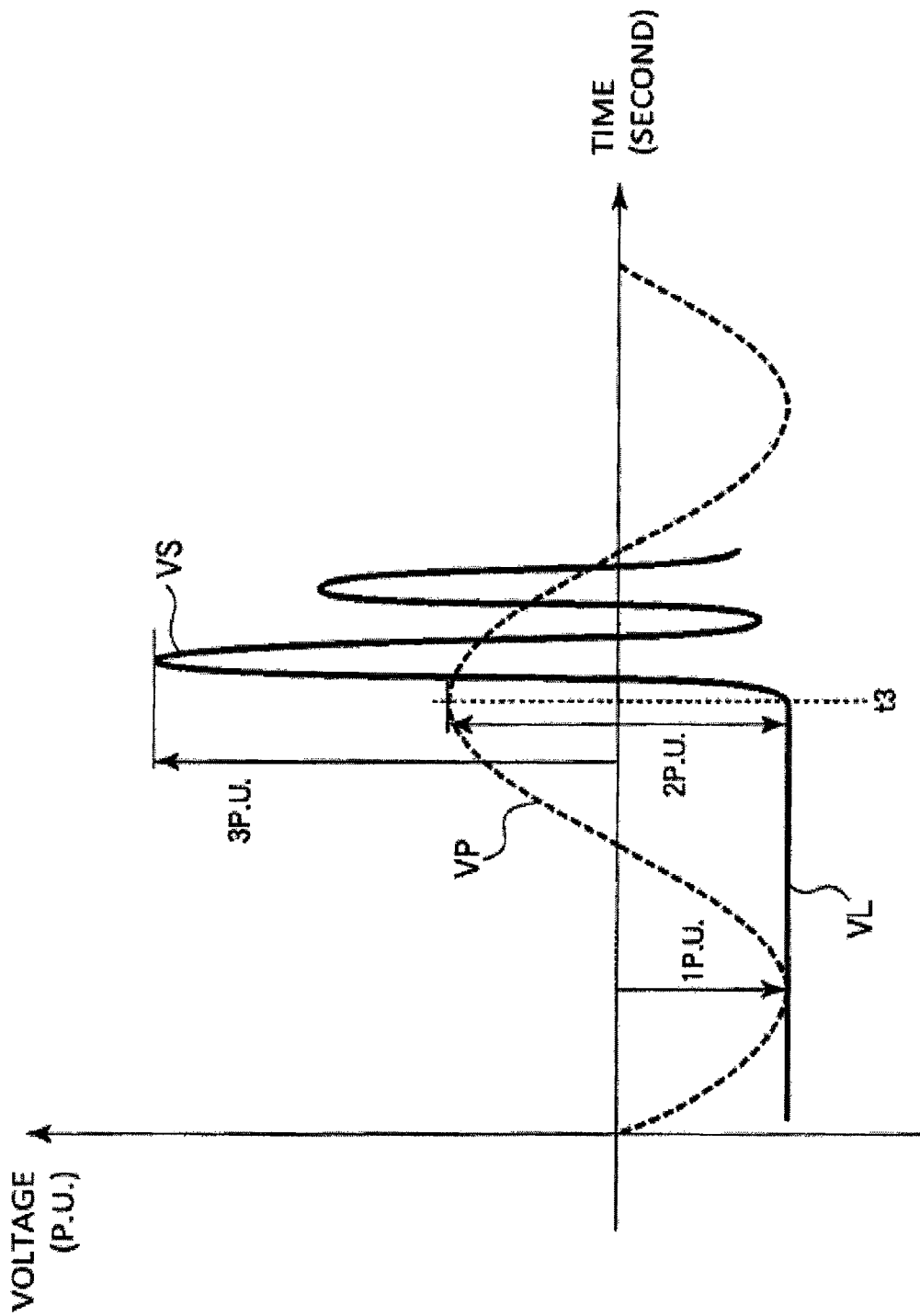
FIG. 20 A waveform diagram drawing schematically a closing arc which is generated in the case that the circuit breaker closes the unloaded transmission line according to the third embodiment.

FIG. 20 is a waveform diagram drawing schematically the closing surge VS which is generated in the case that the circuit breaker closes the unloaded transmission line. FIG. 20 shows the state that the circuit breaker is closed at a time t3 and the closing surge (overvoltage) VS of 3 p.u. to ground is generated.

A power source voltage VP is a sine wave with the wave height value of 1 p.u. A DC voltage VL remaining at the transmission line before the circuit breaker is reclosed is 1 p.u. The voltage between contacts (the difference between the instantaneous value of the power source voltage VP and the DC voltage VL) at the time t3 when the closing surge (overvoltage) VS of 3 p.u. to ground is generated is 2 p.u. That is, the closing surge VS becomes the voltage of 1.5 times the voltage between contacts.

Thus, the waveform monitoring unit 13B2 suppresses the overvoltage caused by the closing surge lower than 3 p.u. by closing the circuit breaker 3U at the time point when the voltage between contacts is a voltage lower than 2 p.u.

Next, the timing to close the circuit breaker 3U by the waveform monitoring unit 13B2 will be described.

Figure 21:
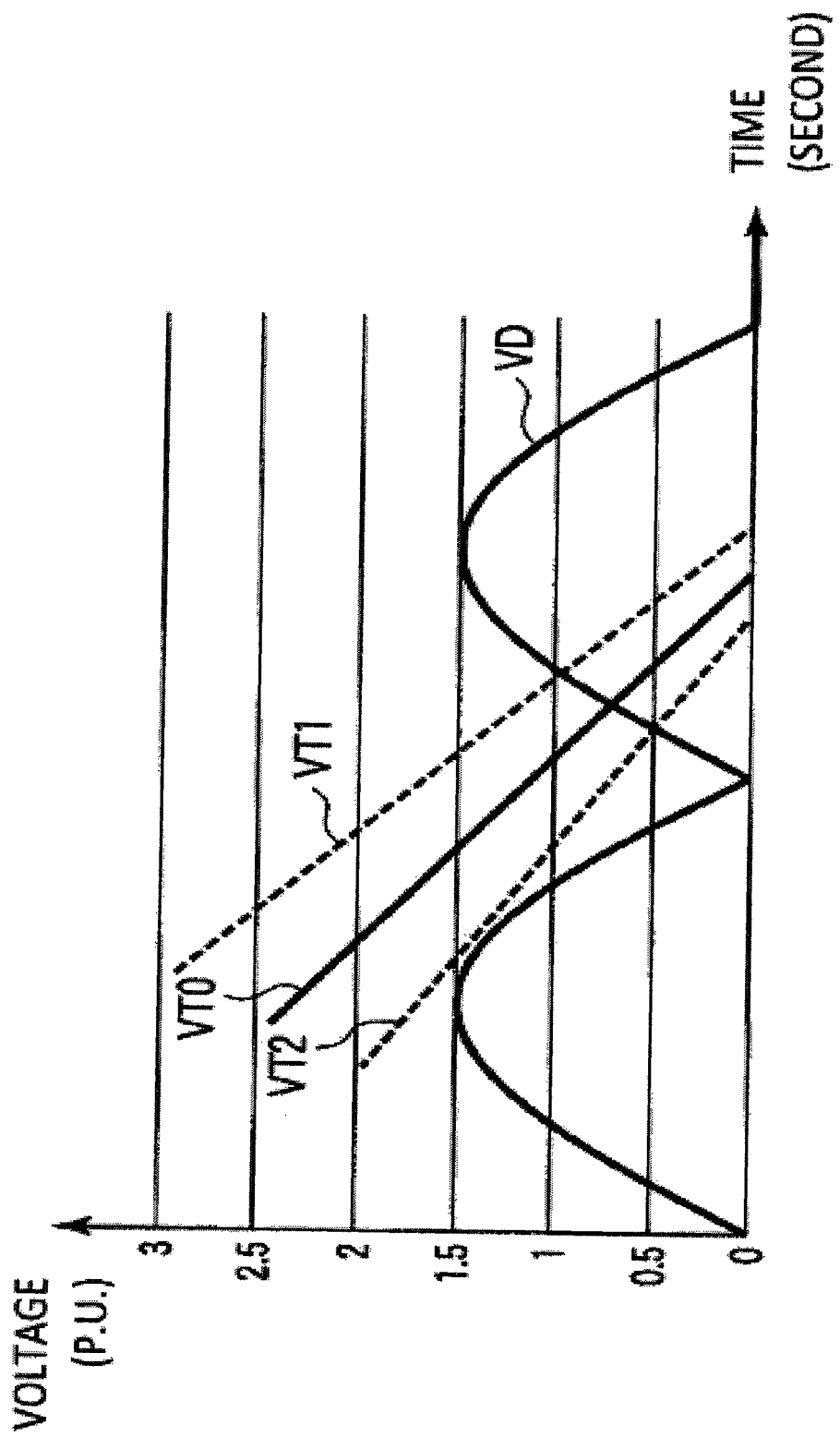
FIG. 21 A characteristic diagram showing a pre-arcing generating voltage characteristic at the time of closing the circuit breaker according to the third embodiment.

FIG. 21 is a characteristic diagram showing pre-arcing generating voltage characteristics VT0, VT1, VT2 at the time of closing the circuit breaker 3U according to the present embodiment. In FIG. 21, a voltage VD between contacts is expressed by absolute value. The wave height value of the voltage VD between contacts is assumed as 1.5 p.u.

The pre-arcing generating voltage characteristic VT0 indicates the pre-arcing generating voltage characteristics of the circuit breaker 3U which becomes the standard. In addition, with respect to the circuit breaker, there are generally the operation variation and the discharge variation. The pre-arcing generating voltage characteristics VT1, VT2 indicate the pre-arcing generating voltage characteristics in consideration of the operation variation and the discharge variation of the circuit breaker 3U assuming the pre-arcing generating voltage characteristic VT0 as their reference.

If it is tried to close the circuit breaker 3U so that the pre-arcing generating voltage characteristic VT2 considering the variations does not make contact with the voltage VD between contacts, the intersection point of the other pre-arcing generating voltage characteristic VT2 considering the variations and the voltage VD between contacts is at about 1 p.u. Accordingly, even if the variations of the circuit breaker 3U is considered, the circuit breaker 3U can be closed in the state that the voltage VD between contacts is not more than 1 p.u. in FIG. 21.

The pre-arcing generating voltage characteristic, the operation variation and the discharge variation are different for the circuit breaker. That is, the gradients of the pre-arcing generating voltage characteristics VT0, VT1, VT2 shown in FIG. 21 are different for the circuit breaker.

However, the pre-arcing generating voltage characteristic becomes a downward sloping straight line for the time regardless of the individual difference of the circuit breaker. That is, in any circuit breaker, the voltage at which the insulation between contacts of the circuit breaker is broken goes down proportionally with the passage of time, that is, with the drop of the distance between contacts. Thus, if the wave height value of voltage between contacts of the circuit breaker is 1.5 p.u., the circuit breaker 3U can surely be closed when the voltage between contacts of the circuit breaker 3U is not more than 1.5 p.u.

In addition, the waveform monitoring unit 13B2 can estimate the phase to close the circuit breaker 3U so that the voltage between contacts becomes not more than 1.5 p.u. by instantaneous value by the calculation processing, without performing the waveform processing. Accordingly, in the case that the time till the secondary arc is extinguished lasts longer than the set time, the waveform monitoring unit 13B2 closes the circuit breaker 3U at the timing when the voltage between contacts is not more than 1.5 p.u. in consideration of the pre-arcing generating voltage characteristics VT0, VT1, VT2 of the circuit breaker 3U. By this, the circuit breaker 3U is controlled so that the overvoltage caused by the closing surge at the time of closing is suppressed smaller than 3 p.u. which is the maximum.

According to the present embodiment, the following operation and effect can be obtained in addition to the operation and effect according to the first embodiment.

The overvoltage suppressing device 10B is provided with the waveform monitoring unit 13B2, and monitors the time till the secondary arc is extinguished after each of the circuit breakers 3U, 3V, 3W is opened. The overvoltage suppressing device 10B closes the circuit breakers 3U, 3V, 3W at the time point when the overvoltage can be suppressed to some extent, without waveform processing by the adder 131 and so on, in the case that the secondary arc is not extinguished within the set time. In this time, as the overvoltage suppressing device 10B calculates the phase to close the circuit breakers 3U, 3V, 3W without performing the waveform processing, can close the circuit breakers 3U, 3V, 3W in a shorter time than in the case of performing the waveform processing.

By this, even in the case that the time till the secondary arc is extinguished is delayed and the operating duty can not exercised if the closing phase is calculated after the waveform processing by the adder 131 and so on, the overvoltage suppressing device 10B can close each of the circuit breakers 3U, 3V, 3W within the time to exercise the operating duty while suppressing the overvoltage due to the closing surge by the waveform monitoring unit 13B2.

Fourth Embodiment

Figure 22:
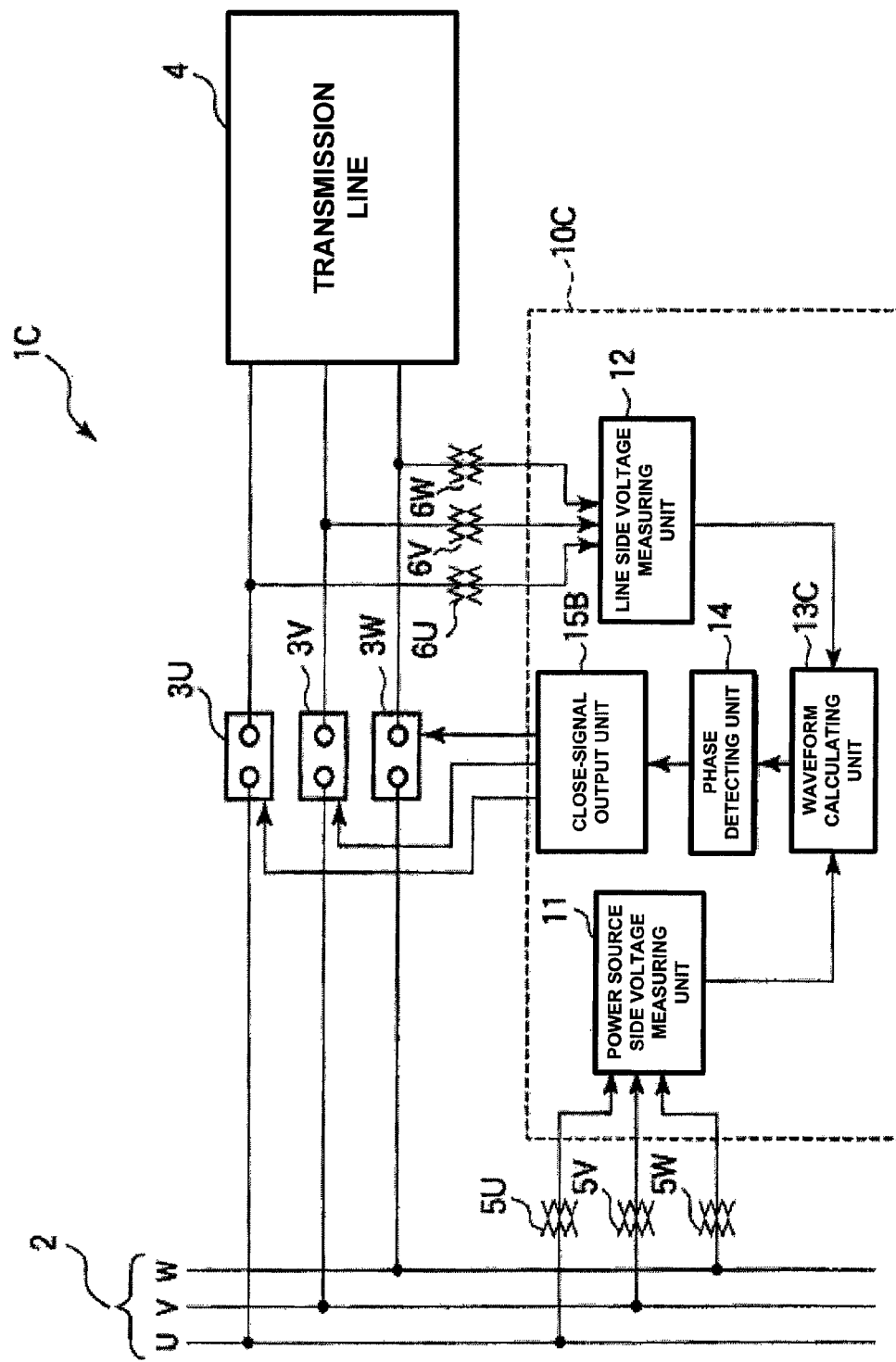
FIG. 22 A construction diagram showing a construction of a power system to which an overvoltage suppressing device according to a fourth embodiment of the present disclosure is applied.

FIG. 22 is a construction diagram showing a construction of a power system 1C to which an overvoltage suppressing device 10C according to a fourth embodiment of the present disclosure is applied.

The power system 1C has a construction in which in the power system 1 according to the first embodiment shown in FIG. 1, the overvoltage suppressing device 10C is provided in place of the overvoltage suppressing device 10. With respect to other points, the power system 1C is the same as the power system 1 according to the first embodiment.

Figure 23:
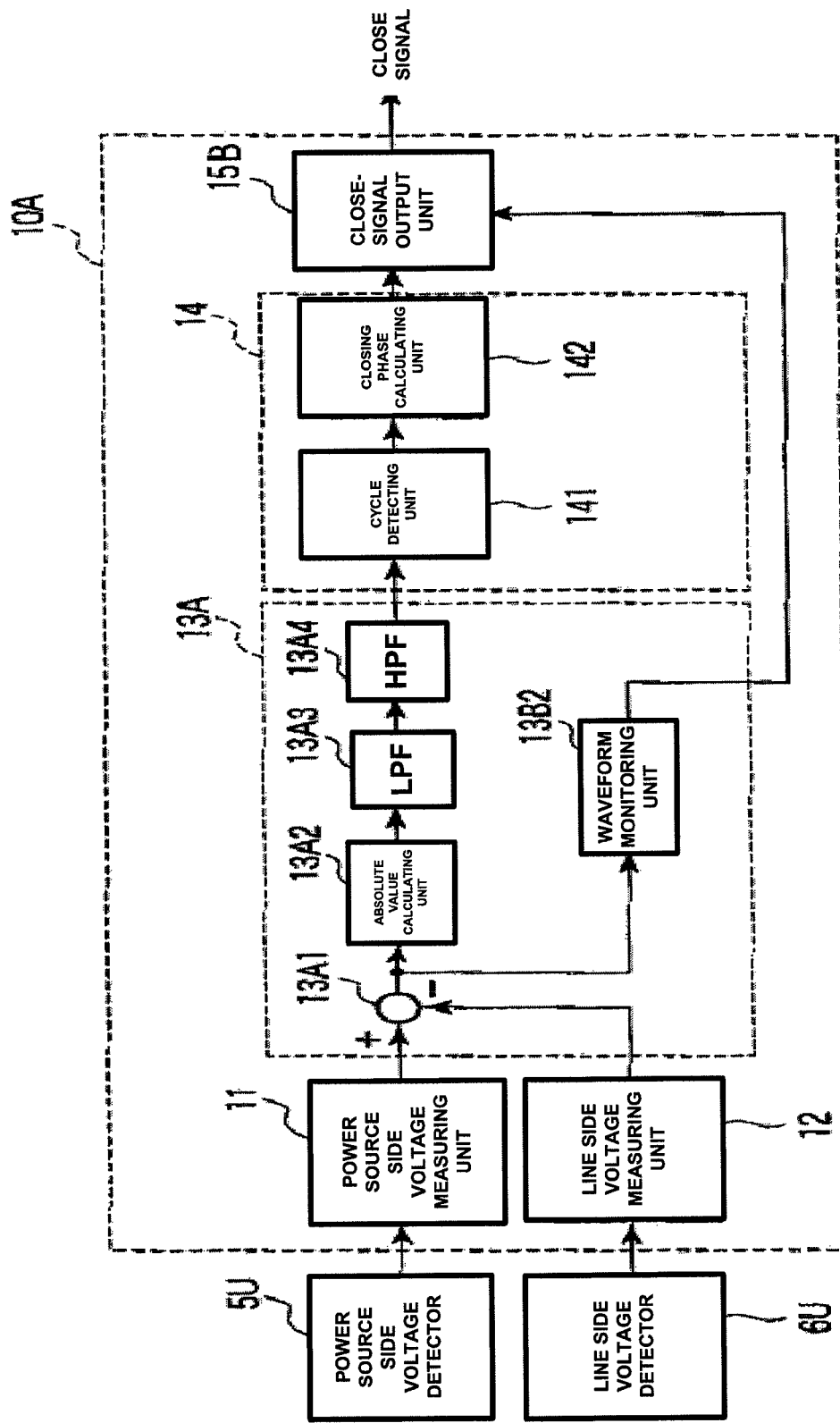
FIG. 23 A construction diagram showing a construction of the overvoltage suppressing device according to the fourth embodiment of the present disclosure.

FIG. 23 is a construction diagram showing a construction of the overvoltage suppressing device 10C according to the present embodiment.

The overvoltage suppressing device 10C has a construction in which in the overvoltage suppressing device 10A according to the second embodiment shown in FIG. 10, a waveform calculating unit 13C is provided in place of the waveform calculating unit 13A, and the close-signal output unit 15B is provided in place of the close-signal output unit 15. With respect to other points, the overvoltage suppressing device 10C is the same as the overvoltage suppressing device 10A according to the second embodiment.

The waveform calculating unit 13C has a construction in which the waveform monitoring unit 13B2 according to the third embodiment shown in FIG. 16 is added to the waveform calculating unit 13A according to the second embodiment shown in FIG. 10. The voltage waveform data of the voltage between contacts which is calculated by the subtractor 13A1 is inputted to the waveform monitoring unit 13B2. With respect to other points, the waveform monitoring unit 13C is the same as the waveform monitoring unit 13A according to the second embodiment.

According to the present embodiment, the following operation and effect can be obtained in addition to the operation and effect according to the second embodiment.

The overvoltage suppressing device 10C is provided with the waveform monitoring unit 13B2, and monitors the time till the secondary arc is extinguished after each of the circuit breakers 3U, 3V, 3W is opened. The overvoltage suppressing device 10C closes the circuit breakers 3U, 3V, 3W at the time point when the overvoltage can be suppressed to some extent, without waveform processing by the absolute value calculating unit 13A2 and so on, in the case that the secondary arc is not extinguished within the set time. In this time, as the overvoltage suppressing device 10C calculates the phase to close the circuit breakers 3U, 3V, 3W without performing the waveform processing, can close the circuit breakers 3U, 3V, 3W in a shorter time than in the case of performing the waveform processing.

By this, even in the case that the time till the secondary arc is extinguished is delayed and the operating duty can not exercised if the closing phase is calculated after the waveform processing by the absolute value calculating unit 13A2 and so on, the overvoltage suppressing device 10C can close each of the circuit breakers 3U, 3V, 3W within the time to exercise the operating duty while suppressing the overvoltage due to the closing surge by the waveform monitoring unit 13B2.

In addition, in each of the embodiments, the construction using the low pass filter and the high pass filter is employed, but a construction using a band pass filter in place of the these filters may be employed. The band pass filter can make only the specific frequency band pass through. For the reason, the band pass filter can be set so as to make the frequency band pass through which is not cut by any of the cutoff frequencies of the low pass filter and the high pass filter. That is, it is possible to set the band pass filter so as to make the specific frequency band pass through which is lower than the commercial frequency (power source frequency) and higher than the low frequency corresponding to the DC component. By setting like this, and by constructing an overvoltage suppressing device using the band pass filter, the same operation and effect as each of the embodiments can be obtained.

In addition, the constituent elements used in each of the embodiments may be constructed with software or hardware, or may be constructed with the combination thereof. Various kinds of the filters may be an analog filter, or a digital filter, for example. In addition, Various kinds of the calculating circuits, such as the subtractor may be a construction by hardware (including calculation and so on by wire connection of the wiring to take in the voltage), or a construction in which the digital data is calculated by a computer.

In addition, each of the embodiments may be handled by an algorithm to calculate the maximum value or minimum value of the waveform without providing the high pass filter. If the low frequency components FL1, FL1A in the frequency band which is lower than the frequency of the power source bus 2 and higher than the frequency of the DC component are present definitely to some extent, for example, the maximum values and minimum values of the low frequency components FL1, FL1A may be obtained using the algorithm without eliminating the DC component. That is, if the maximum values and minimum values of the low frequency components FL1, FL1A can be obtained substantially, any construction may be used, because it is the same as to extract the low frequency components FL1, FL1A. Depending upon the capability of the computation speed of the computer which is used in the overvoltage suppressing device and the balance with the operating duty of the circuit breaker, the construction thereof can be changed arbitrarily.

In addition, it is generally known that the phase of the waveform after filtering shifts from the previous waveform as a result of setting the cutoff frequency of the filter. In the first embodiment, the time point when the voltage waveform W8 after filtering shown in FIG. 8 becomes maximum in the positive polarity conforms with the time point when the voltage waveform W5 of the voltage between contacts shown in FIG. 5 becomes small. But, depending upon the constants of various kinds of the filters 133, 134, the time point may possibly become a time point when the voltage becomes maximum in the negative polarity. In this case, the future proper closing time point can be estimated by detecting the cycle of the time points when the voltage waveforms W8 become maximum in the negative polarity after filtering. Similarly, in the second embodiment, even if the phase shifts depending on the constants of various kinds of the filters 13A3, 13A4, the future proper closing time point can be estimated by shifting the cycle to detect the voltage waveform W14 after filtering shown in FIG. 14 in conformity with the shift in the phase.

In addition, the present disclosure is not limited to the above-described embodiments without modification, but can be embodied by modifying the constituent elements within the scope without departing from the spirit of the disclosure in the embodying stage. In addition, various disclosures are formed by the proper combination of a plurality of constituent elements disclosed in the above-described embodiments. Some of the constituent elements may be deleted from the whole constituent elements shown in the embodiments, for example. In addition, the constituent elements included in the different embodiments may be combined arbitrarily.

What is claimed is:

1. A system comprising:
   a power source side voltage detector operable to measure a waveform of a power source side voltage that is a voltage to ground at a power system side of a circuit breaker;
   a transmission line side voltage detector operable to measure a waveform of a transmission line side voltage that is a voltage to ground at the transmission line side of the circuit breaker;
   a waveform calculating device in communication with the power source side voltage detector and transmission line side voltage detector operable to:
      calculate an added waveform of the waveform of the power source side voltage that is measured by the power source side voltage detector and the waveform of the transmission line side voltage that is measured by the transmission line side voltage detector;
      calculate a waveform of an absolute value of the added waveform;
      extract a waveform of a component in a frequency band which is lower than a frequency of the power source side voltage and higher than a frequency of a DC component, from the waveform of the absolute value; and
      detect a cycle of the extracted waveform; and
   a switch operable to close the circuit breaker based on the detected cycle.

2. The system of claim 1 wherein the waveform calculating device further comprises a low pass filter to extract a low frequency component and a high pass filter to extract a high frequency component, a phase detecting unit, and a close-signal output unit.

3. The system of claim 1 wherein the waveform calculating device further comprises a band pass filter to extract a prescribed frequency band.

4. The system of claim 1 wherein the waveform calculating device is further operable to:
   determine whether a secondary arc current flowing through the transmission line is extinguished within a prescribed time;
   calculate a waveform of a voltage between contacts of the circuit breaker that is a difference between the waveform of the power source side voltage and the waveform of the transmission line side voltage;
   estimate a time point to close the circuit breaker when an absolute value of an instantaneous value of the voltage between contacts becomes a voltage value lower than a threshold value, in the case that the secondary arc is not extinguished within the prescribed time; and
   close the circuit breaker at the estimated time point to close the circuit breaker.

5. The system of claim 4 wherein the waveform calculating device further comprises a band pass filter to extract a prescribed frequency band.

6. The system of claim 4 wherein the waveform calculating device further comprises a low pass filter to extract a low frequency component and a high pass filter to extract a high frequency component.

7. A system comprising:
a power source side voltage measuring unit operable to measure a waveform of a power source side voltage that is a voltage to ground at a power system side of a circuit breaker;
a transmission line side voltage measuring unit operable to measure a waveform of a transmission line side voltage that is a voltage to ground at the transmission line side of the circuit breaker;
a computer in communication with power source side voltage measuring unit and the transmission line side voltage measuring unit operable to:
calculate a waveform of a voltage between contacts of the circuit breaker that is a difference between the waveform of the power source side voltage and the waveform of the transmission line side voltage;
calculate a waveform of an absolute value of the waveform of the voltage between contacts;
extract a waveform of a component in a frequency band which is lower than a frequency of the power source and higher than a frequency of a DC component, from the waveform of the absolute value; and
detect a cycle of the extracted waveform; and
a circuit operable to close the circuit breaker based on the detected cycle.

8. The system of claim 7 wherein the computer further comprises a low pass filter to extract a low frequency component and a high pass filter to extract a high frequency component.

9. The system of claim 7 wherein the computer further comprises a band pass filter to extract a prescribed frequency band.

10. The system of claim 7 wherein the computer is further operable to:
determine whether a secondary arc current flowing through the transmission line is extinguished within a prescribed time;
estimate a time point to close the circuit breaker when an absolute value of an instantaneous value of the voltage between contacts becomes a voltage value lower than a threshold value, in the case that the secondary arc is not extinguished within the prescribed time; and
close the circuit breaker at the estimated time point to close the circuit breaker.

11. The system of claim 10 wherein the computer further comprises a low pass filter to extract a low frequency component and a high pass filter to extract a high frequency component.

12. The system of claim 10 wherein the computer further comprises a band pass filter to extract a prescribed frequency band.

13. A method comprising:
measuring a waveform of a power source side voltage which is a voltage to ground at the power system side of a circuit breaker;
measuring a waveform of a transmission line side voltage which is a voltage to ground at the transmission line side of the circuit breaker;
calculating an added waveform of the waveform of the power source side voltage and the waveform of the transmission line side voltage;
extracting a waveform of a component in a frequency band which is lower than a frequency of the power source and higher than a frequency of a DC component from the added waveform;
detecting a cycle of the extracted waveform; and
closing the circuit breaker based on the cycle.

14. The method of claim 13 further comprising:
determining whether or not a secondary arc current flowing through the transmission line is extinguished within a prescribed time;
calculating a waveform of a voltage between contacts of the circuit breaker which is a difference between the waveform of the power source side voltage and the waveform of the transmission line side voltage;
estimating a time point to close the circuit breaker when an absolute value of an instantaneous value of the voltage between contacts becomes a voltage value lower than a threshold value, based on the waveform of the voltage between contacts, in the case that it is judged that the secondary arc is not extinguished within the prescribed time; and
closing the circuit breaker at the time point.

15. A method comprising:
measuring a waveform of a power source side voltage which is a voltage to ground at the power system side of a circuit breaker;
measuring a waveform of a transmission line side voltage which is a voltage to ground at the transmission line side of the circuit breaker;
calculating a waveform of a voltage between contacts of the circuit breaker that is a difference between the waveform of the power source side voltage and the waveform of the transmission line side voltage;
calculating a waveform of an absolute value of the waveform of the voltage between contacts;
extracting a waveform of a component in a frequency band which is lower than a frequency of the power source and higher than a frequency of a DC component from the waveform of the absolute value;
detecting a cycle of the extracted waveform; and
closing the circuit breaker based on the cycle.

16. The method of claim 15 further comprising:
determining whether or not a secondary arc current flowing through the transmission line is extinguished within a prescribed time;
estimating a time point to close the circuit breaker when an absolute value of an instantaneous value of the voltage between contacts becomes a voltage value lower than a threshold value, based on the waveform of the voltage between contacts, in the case that it is judged that the secondary arc is not extinguished within the prescribed time; and
closing the circuit breaker at the time point.

17. An apparatus comprising:
at least one computer-readable non-transitory storage medium comprising code, that, when executed by at least one processor, is operable to:
receive a waveform of a power source side voltage that is a voltage to ground at a power system side of a circuit breaker;
receive a waveform of a transmission line side voltage that is a voltage to ground at the transmission line side of the circuit breaker;

calculate an added waveform of the waveform of the power source side voltage that is measured by the power source side voltage detector and the waveform of the transmission line side voltage that is measured by the transmission line side voltage detector;

calculate a waveform of an absolute value of the added waveform;

extract a waveform of a component in a frequency band which is lower than a frequency of the power source side voltage and higher than a frequency of a DC component, from the waveform of the absolute value;

detect a cycle of the extracted waveform; and close the circuit breaker based on the detected cycle.

18. The apparatus of claim 17 wherein the processor is further operable to:

determine whether or not a secondary arc current flowing through the transmission line is extinguished within a prescribed time;

estimate a time point to close the circuit breaker when an absolute value of an instantaneous value of the voltage between contacts becomes a voltage value lower than a threshold value, based on the waveform of the voltage between contacts, in the case that it is judged that the secondary arc is not extinguished within the prescribed time; and close the circuit breaker at the time point.

19. An apparatus comprising:

at least one computer-readable non-transitory storage medium comprising code, that, when executed by at least one processor, is operable to:

receive a waveform of a power source side voltage that is a voltage to ground at a power system side of a circuit breaker;

receive a waveform of a transmission line side voltage that is a voltage to ground at the transmission line side of the circuit breaker;

calculate a waveform of a voltage between contacts of the circuit breaker that is a difference between the waveform of the power source side voltage and the waveform of the transmission line side voltage;

calculate a waveform of an absolute value of the waveform of the voltage between contacts;

extract a waveform of a component in a frequency band which is lower than a frequency of the power source and higher than a frequency of a DC component, from the waveform of the absolute value;

detect a cycle of the extracted waveform; and close the circuit breaker based on the detected cycle.

20. The apparatus of claim 19 wherein the processor is further operable to:

determine whether a secondary arc current flowing through the transmission line is extinguished within a prescribed time;

estimate a time point to close the circuit breaker when an absolute value of an instantaneous value of the voltage between contacts becomes a voltage value lower than a threshold value, in the case that the secondary arc is not extinguished within the prescribed time; and close the circuit breaker at the estimated time point to close the circuit breaker.

* * * * *